United States Patent
Bassett et al.

(10) Patent No.: US 8,246,883 B2
(45) Date of Patent: Aug. 21, 2012

(54) FILTER CARTRIDGE AND METHOD OF CONSTRUCTION THEREOF

(75) Inventors: Laurence W. Bassett, Killingworth, CT (US); William Contaxis, III, Milford, CT (US); Karl J. Fritze, Hastings, MN (US); Mahesh Z. Patel, Plantsville, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/135,915

(22) Filed: Jun. 9, 2008

(65) Prior Publication Data

US 2008/0237924 A1 Oct. 2, 2008

Related U.S. Application Data

(63) Continuation of application No. 11/429,711, filed on May 8, 2006, now abandoned.

(60) Provisional application No. 60/679,273, filed on May 8, 2005.

(51) Int. Cl.
*B01D 35/00* (2006.01)
(52) U.S. Cl. ...... 264/279; 264/264; 264/271.1; 264/279.1; 264/255; 264/259; 264/275; 210/312; 210/446; 210/315; 210/321.8
(58) Field of Classification Search ......... 264/264, 264/DIG. 48, 271.1, 279.1, 255; 210/312, 210/446, 315, 321.8
See application file for complete search history.

(56) References Cited

U.S. PATENT DOCUMENTS

| | | | |
|---|---|---|---|
| 2,850,168 A | 9/1958 | Nostrand | |
| 3,469,696 A | 9/1969 | Petrucci et al. | |
| 4,358,375 A * | 11/1982 | Wood | 210/266 |
| 4,414,172 A * | 11/1983 | Leason | 264/255 |
| 5,300,224 A | 4/1994 | Farley | |
| 5,453,118 A | 9/1995 | Heiligman | |
| 5,735,420 A | 4/1998 | Nakamaki et al. | |
| 5,817,263 A | 10/1998 | Taylor | |

(Continued)

FOREIGN PATENT DOCUMENTS

GB 791148 2/1958

(Continued)

OTHER PUBLICATIONS

Anna-Reddy, Murali. "Moldflow Plastics Insight 4.0—MPI/3D Enhancements." Moldflow Corporation 2004. pp. 1-7. Found at: http://www.moldflow.com/flowfront/0304/whats/index.asp.*

*Primary Examiner* — Philip Tucker
*Assistant Examiner* — Vicki Wu

(57) ABSTRACT

A filter cartridge includes a one-piece housing having a port and a filtration element disposed in the housing. The filtration element is a coherent filter block that can be larger in cross dimension than the port. The filtration element can be a coherent filter block that generally conforms to the shape of the hollow interior, but is slightly smaller than the hollow interior so as to define a gap between the filtration element and the inner surface. One method for constructing a filter cartridge includes providing a housing having a hollow interior and at least one port, introducing a granular material into the hollow interior via the port, and transforming the granular material in the hollow material into a coherent filter block. Another method for constructing a filter cartridge includes providing a filtration element in the form of a coherent filter block, and overmolding a housing around the filtration element.

21 Claims, 16 Drawing Sheets

U.S. PATENT DOCUMENTS

| | | |
|---|---|---|
| 5,917,066 A | 6/1999 | Eisenmann et al. |
| 6,267,887 B1 | 7/2001 | Hughes et al. |
| 7,387,730 B2 * | 6/2008 | Nakahara et al. ........... 210/321.8 |
| 2002/0084217 A1 * | 7/2002 | Schann .......................... 210/446 |
| 2003/0070975 A1 * | 4/2003 | Hogan et al. .................. 210/232 |
| 2003/0222010 A1 * | 12/2003 | Bassett et al. ................. 210/312 |
| 2005/0279695 A1 * | 12/2005 | Straeffer et al. .............. 210/335 |
| 2006/0210746 A1 * | 9/2006 | Shi et al. ...................... 428/35.7 |
| 2006/0226582 A1 * | 10/2006 | Patton et al. .................. 264/513 |

FOREIGN PATENT DOCUMENTS

| | | |
|---|---|---|
| WO | WO 03/064941 A1 | 8/2003 |

* cited by examiner

FILTER CARTRIDGE AND METHOD OF CONSTRUCTION THEREOF

RELATED APPLICATIONS AND PRIORITY CLAIM

This application is a continuation of U.S. application Ser. No. 11/429,711 filed May 8, 2006, now abandoned, which claims priority to U.S. Provisional Patent Application No. 60/679,273, filed on May 8, 2005.

BACKGROUND

This invention relates generally to filter cartridges and more particularly to filter cartridges having integrated filtration elements.

Filter cartridges typically comprise a porous filtration element disposed within a structural housing. In such filters, unfiltered fluid enters the housing through an inlet port and passes through the filtration element, which removes contaminants or other impurities from the fluid. The filtered fluid is discharged through an outlet port. Filter cartridges include so-called "quick change" cartridges that typically have the inlet and outlet combined in a single port at one end of the housing and in-line cartridges in which the inlet and outlet ports are located at opposite ends of the housing. Because the fluid flow is often pressurized, these ports are typically sealed, such as with an O-ring or the like. It is therefore desirable to provide small ports because larger openings are more difficult to seal (the larger the seal, the larger the force it is subjected to for a given pressure). Accordingly, the ports are typically smaller in cross dimension than the interior of the housing that contains the filtration element.

It is known to use a bed of granular filtration media, such as powdered activated carbon, activated alumina, silica, zeolites and the like, as the filtration element. (As used herein, the term "granular" is intended to encompass any material in a divided state; that is, material comprising separate particles that easily move and change their relative position without a separation of the mass and that are generally capable of flowing. The term "particle" refers to any relatively small, discrete portion or piece of something and includes grains, granules, particles, pellets, fibers and the like.) A granular filtration media can be poured into the housing interior through the small port. Suitable materials can be added to lightly compress the filtration media so that it is held in a semi-compact arrangement. However, because there is little or no cohesion within the granular filtration media, such filter systems can experience redistribution of the media particles and channeling (i.e., filtrate flowing through the bed of granular material in preferential flow paths, instead of a uniform flow distribution). This can result in a decreased filtration quality. Filter systems employing loose filtration media can also suffer from poor filtration efficiency.

A common solution to these drawbacks has been the advent of compacted filtration media that are molded or extruded into a stable shape, using a suitable glue or binder, which is typically fused by heating. Advances in polymer sintering have allowed suitable filtration elements to be produced by gently dispensing a mixture of a granular filtration media and powdered polymers into a simple mold and heating to a prescribed temperature for a prescribed period of time to form a coherent, self-supporting porous matrix. Such stable-shape filtration elements, typically referred to as "filter blocks," are very good at forcing all filtrate through a constant torturous path without channeling and can be made with very small and uniform porosity to improve filtration efficiency in the low-micron range.

Unfortunately, because of their rigid shape, filter blocks cannot be installed through small filter housing ports and require a large opening to install them into the structural housing. Consequently, the state of the art is a two-piece housing assembly comprising a first component that contains the filter block and a second component that closes the first component. In this arrangement, the first component (often referred to as the "can" or "sump") must initially provide a sufficiently large opening to allow the coherent filter block to be installed. The first component is commonly configured as a generally cylindrical barrel closed at one end and open at the other end to provide the large opening through which the filter block is inserted. The filter block is then enclosed by the second component (frequently referred to as the "cap" or "head"), which is placed over the large opening and attached (such as by welding or threaded connection) to the first component.

While such filter cartridges provide excellent performance, the two-piece design can add to the material, fabrication and assembly costs. Accordingly, it would be desirable to have a filter cartridge that is easier and more cost effective to manufacture than current filter cartridges. Additionally, it is desirable to eliminate the metal molds for forming the filter blocks and instead, form the blocks directly by using the one-piece filter housing itself.

SUMMARY

The above-mentioned need is met by the present invention, which in one embodiment provides a filter cartridge that includes a one-piece housing having a port and a filtration element disposed in the housing. The filtration element is a coherent filter block that can be, but is not necessarily, larger in cross dimension than the port.

In another embodiment, the present invention includes a method of constructing a filter cartridge comprising providing a housing having a hollow interior and at least one port, introducing a granular material into the hollow interior via the port, and transforming the granular material in the hollow material into a coherent filter block.

In another embodiment, the present invention includes a method of constructing a filter cartridge comprising providing a filtration element in the form of a coherent filter block, and overmolding a housing around the filtration element.

In another embodiment, the invention provides a filter cartridge comprising a filtration element in the form of a coherent filter block and an overmolded housing around the filtration element.

Another embodiment provides a filter cartridge that includes a one-piece housing having an inner surface defining a hollow interior and a filtration element disposed in the housing. The filtration element is a coherent filter block that generally conforms to the shape of the hollow interior, but is slightly smaller than the hollow interior so as to define a gap between the filtration element and the inner surface.

In another embodiment, the present invention includes a filter cartridge having a housing including a port and an inner surface defining a hollow interior. The filter cartridge further includes a flow distribution tube having a stem that is disposed in the hollow interior. A filtration element is mounted on the stem. The filtration element is a coherent filter block that generally conforms to the shape of the hollow interior but is slightly smaller than the hollow interior so as to define a gap between the filtration element and the inner surface.

In another embodiment, the present invention includes a method of constructing a filter cartridge comprising providing a housing having at least one port and an inner surface defining a hollow interior and introducing a granular material into the hollow interior via the port. The granular material is formulated so that it will shrink during processing. The granular material is processed to transform it into a coherent filter block that generally conforms to the shape of the hollow interior but is slightly smaller than the hollow interior so as to define a gap between the filtration element and the inner surface.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION

Figure 1:
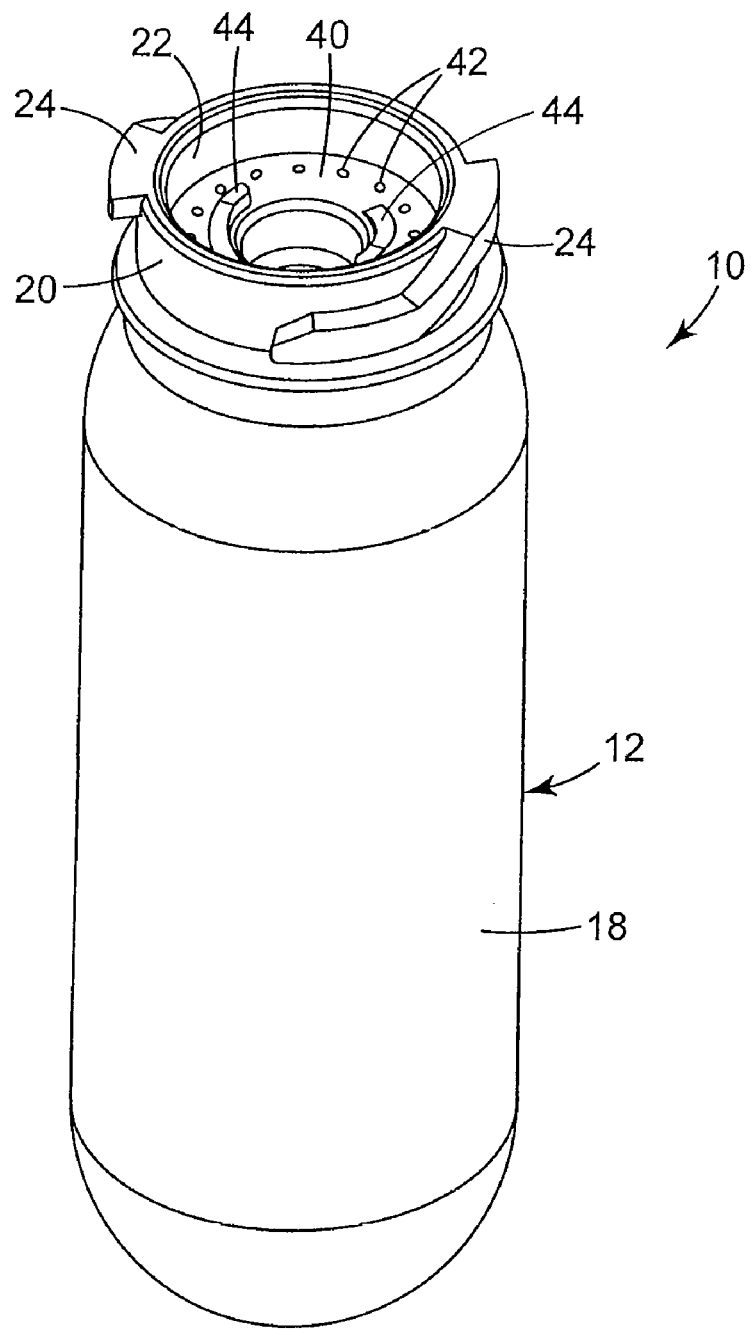
FIG. 1 is a perspective view of a filter cartridge in accordance with one embodiment of the present invention.
Figure 2:
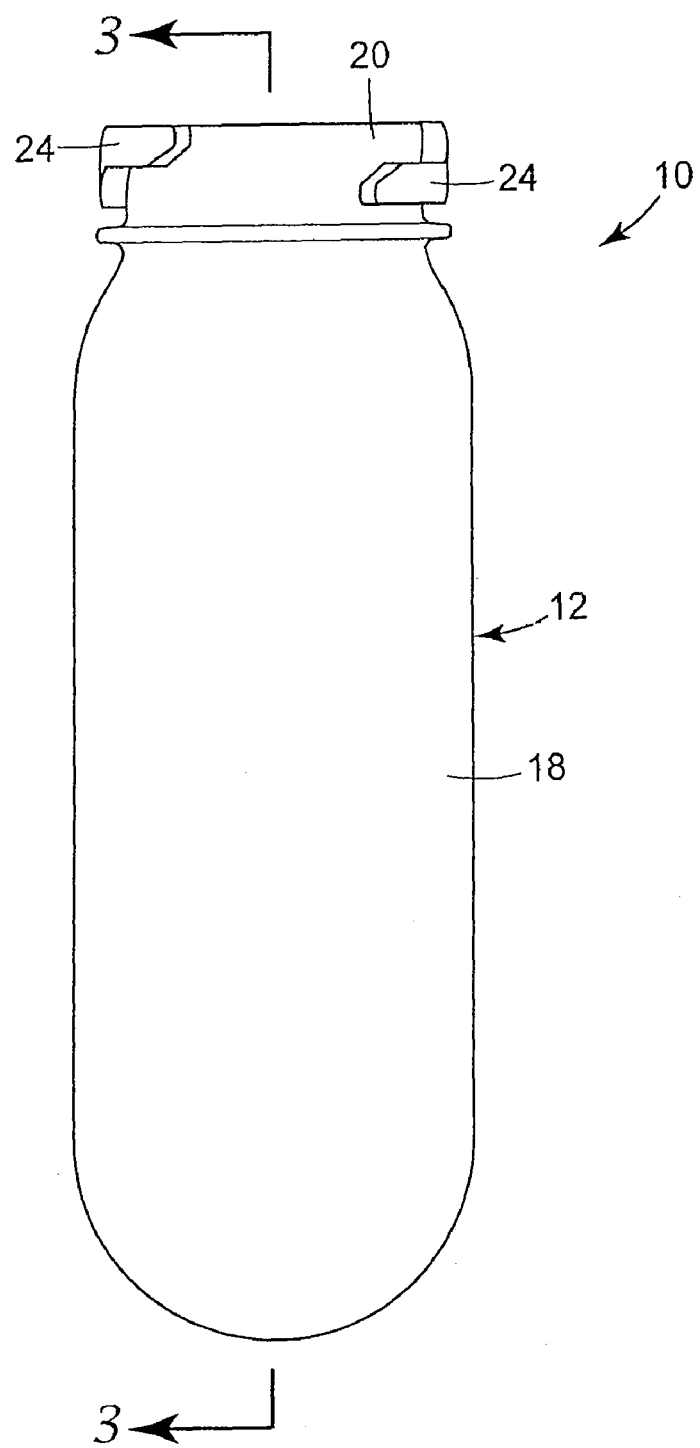
FIG. 2 is a side view of the filter cartridge of FIG. 1.

Representative embodiments of the present invention include a filter cartridge having a housing and a filtration element contained within the housing. The housing defines a hollow interior that holds the filtration element and has at least one port in fluid communication with the interior for providing fluid ingress and/or egress. The port is typically, although not necessarily, smaller in cross section than the housing interior. In one embodiment of the invention, the filtration element is a coherent filter block that is formed and thermally set within the housing interior. That is, the housing functions as a mold for forming the shaped filter block. This is done by dispensing a suitable granular material into the housing interior through the port. The material easily passes through the small port because of its granular nature. Once the housing interior is filled to the desired level, the granular material is transformed into the coherent filter block by sintering. As used herein, "sintering" refers to the process of using heat, with or without pressure, to fuse discrete particles into a coherent, semi-permanent structure. More specifically, the granular material is heated to a temperature at which the molecules at the surface of at least some of the particles become mobile enough to intermingle with molecules at the surface of adjoining particles, thus forming a bond between the adjoining particles. Spaces remaining between particles form pores. The granular material is maintained at the sintering temperature until the desired degree of bonding has occurred. Other possible processes for transforming the granular material into a filter block include, but are not limited to, electron beam processing, UV processing, moisture-cure chemistry, radio-frequency electromagnetic induction, and catalytic processing.

The result is a porous filter block that conforms to the shape of the housing interior. The filter block, which was introduced into the housing interior through the port (while in a granular state), is a coherent structure having larger dimensions than the port.

In one embodiment, the granular material is formulated so that it will shrink during the transformation process. This property allows the granular material to conform to the interior shape of the housing during filling and then shrink into a smaller element that can be designed not to stick or bond to the inner surface of the housing. This results in a substantially annular space between the filtration element and the inner surface of the housing that provides a filtrate flow path. An advantage of this design is that the filtration element can be completely divorced from the flexing of the housing wall due to shock, handling, or fluid pressure. Furthermore, although smaller than the housing interior, the filtration element can still have larger dimensions than the port. In other words, the filtration element becomes a coherent structure that is larger than the port but was introduced into the housing interior through the port (while in a granular state).

Using the housing as a mold for forming the filter block reduces manufacturing costs by eliminating the need for an expensive metal mold. This also substantially reduces the amount of energy used for heating and cooling the mold, as well as the maintenance required for metal molds.

This arrangement allows the housing to be a one-piece construction instead of two or more components that are structurally attached together into an assembly. The use of a one-piece housing enables a cost reduction relative to a multi-piece assembly. A polymeric one-piece housing can be fabricated by any suitable process including blow molding or injection molding with gas or water assist. Blow molding is generally faster and less expensive that injection molding. Blow molding also stretches and aligns the polymer chains and produces stronger and tougher resultant material properties as compared to injection molding. Either process can produce a hollow container with an interior that has a larger dimension then the throat or port sizes desired at the connection end, much like a plastic bottle. Alternatively, the housing can be metallic and fabricated by a casting method or spin forming. And while a one-piece construction provides cost benefits, the housing could alternatively be produced as a two (or more) piece assembly of parts formed by injection molding or casting. Using the housing as a mold for forming the filter block reduces manufacturing costs by eliminating the need for an expensive metal mold. This also substantially reduces the amount of energy used for heating and cooling the mold, as well as the maintenance required for metal molds.

The granular material that becomes the filter block can comprise one or more of a variety of materials including polyethylene (particularly ultra-high molecular weight polyethylene and cross-linked polyethylene) polyester, epoxy, carbons, ceramics, fibers, oxides, etc. The granular material can preferably, but not necessarily, comprise a mixture of a filtration media and a binder. The filtration media can be one of several types of adsorbent material that will function as a porous matrix, including but not limited to, powered or granular activated carbon, diatomaceous earth, perlite, activated alumina, silica, ion exchange resins, ryholites, and zeolites. The filtration media can also comprise non-adsorbent materials such as natural fibers, man-made fibers and certain plastic powders including polyolefins, such as polyethylene and polypropylene, polystyrene, polyvinyl chloride, polycarbonate, polysulfone, nylon and polyester. These polymers can also be processed to become partially or fully crosslinked as to reduce their tendency to flow when melted.

Possible binders include thermoplastic polymers, such as polyolefins, which have the property of softening and fusing when heated and then hardening again when cooled. One particularly suitable binder is ultra-high molecular weight polyethylene (UHMWPE), which has a very low melt flow index. The very low melt flow index can be desired because keeps the politer from becoming liquid and from flowing and coating the active filtration sites during processing, but instead the polymer becomes just sticky enough for good point-to-point bonding. Very low melt flow index polymers are able to be heated to a wide temperature range without causing the polymer to liquidize. Use of binders having a high melt flow index with an adsorbent filtration media can cause blinding of the active sites of the adsorbent material. A filter block produced using ultra-high molecular weight polyethylene in combination with an adsorbent filtration media such as activated carbon achieves a high adsorbency and a very porous structure. Other thermoplastic polymers that can be used as the binder include ethylene-vinyl acetate, polystyrene, polyvinyl chloride, polycarbonates, polysulfones, polyesters and nylons. Thermosetting polymers can also be used as the binder. As an alternative to a mixture of a filtration media and a binder, the granular material could entirely comprise a polymer. In this case, the resulting filtration element would be a particulate filter.

Referring now to the drawings wherein identical reference numerals denote the same elements throughout the various views, FIGS. 1-4 show a filter cartridge 10 constructed in accordance with one embodiment of the present invention.

The filter cartridge 10 includes a housing 12, a filtration element 14 disposed in the housing 12, and a flow distribution tube 16 extending in part through the filtration element 14. In this embodiment, the housing 12 is a bottle-like, one-piece construction comprising a substantially cylindrical, elongated body 18 having a hollow interior and a central, longitudinal axis. The body 18 is closed at one end and has an open neck 20 formed on the other end. The neck 20 defines a port 22 for providing fluid communication to the hollow interior. The port 22 is shown as being smaller in cross dimension than the body 18 to facilitate sealing thereof. However, it should be noted that the port 22 could alternatively be equal in cross dimension to the body 18. A pair of diametrically opposed shoulders 24 is formed on the outer surface of the neck 20. The shoulders 24 are designed to interface with corresponding structure for connecting the filter cartridge into a filtering system. The housing 12 can be made from any suitable material; one material that is particularly suitable for many applications is polyethylene terephthalate (PET).

The filtration element 14 is a coherent filter block (e.g., a matrix of granular filtration media and a binder) that is formed and thermally set within the interior of the housing 12. The filtration element 14 fills the housing interior from the bottom of the housing 12 to a point just below the neck 20 and conforms to the substantially cylindrical shape of the housing interior. As such, the filtration element 14 is larger in cross dimension than the port 22 in the illustrated embodiment. In the illustrated embodiment, the filtration element 14 includes three distinct sections positioned longitudinally in the housing 12. A first section 26 is located in the uppermost portion of the housing interior (that is, nearest to the neck 20), a second section 28 is located below the first section 26, and a third section 30 is located below the second section 28 at the bottom of the housing interior (that is, farthest from the neck 20). The first section 26 has a relatively open porosity that is effective for particle removal and is less likely to plug. Suitable filtration media materials for the first section 26 include cellulose, cotton and wood fiber combined with an appropriate binder such as the previously mentioned UHMWPE. Other suitable filtration media materials for the first section 26 include powdered and granulated carbon and polyethylene or polypropylene fibers, powders and granules. The first section 26 can be provided with a stratified makeup (graded density) designed for depth filtration. The second section 28 has a less open porosity and preferably comprises a finer filtration media (such as activated carbon or a carbon blend) combined with an appropriate binder such as UHMWPE. The third section 30, which occupies the shortest axial length of the three sections, has the largest, most open porosity and is designed to allow filtrate to flow straight through and pass into the flow distribution tube 16, as described in more detail below. Suitable filtration media materials for the third section 30 include sand, diatomaceous earth and loose polymer pellets combined with an appropriate binder such as UHMWPE. The three-section filtration element described herein is just one example of a filtration element that can be used in this embodiment; many other configurations are possible.

The flow distribution tube 16, which is preferably made of a rigid or semi-rigid material such as plastic or metal, is positioned coaxially inside the housing 12 and includes a narrow tube section 32 that extends through the length of the filtration element 14 to provide a return flow passage. The tube section 32 has a closed first end and an open second end. The first end defines a tapered tip 34 that is very close to, or in contact with, the closed bottom of the housing 12. A number of openings 36 are formed through the tube wall adjacent to the tip 34 and spaced about the circumference of the tube section 32. The openings 36 permit filtrate flowing through the filtration element 14 to flow into the tube section 32. Preferably, the openings 36 are axially positioned sufficiently close to the tip 34 so that they are located within the relatively high porosity third section 30 of the filtration element 14.

The open second end of the tube section 32 is positioned adjacent to the port 22, beyond the filtration element 14. A cylindrical cup section 38 is formed concentrically on the second end so as to be disposed within the port 22. The cup section 38 has a larger diameter than the tube section 32 and is positioned inside the port 22. An annular flange 40 is formed on the upper edge of the cup section 38. The flange 40 has a circular outer edge defining an outside diameter that is substantially equal to the diameter to the port 22 so that the outer edge snugly abuts the inner surface of the neck 20. A number of holes 42 are formed in the flange 40 to allow fluid communication between the "head space" (i.e., the portion of the port 22 located above the flange 40) and the interior of the housing 12. The holes 42 are preferably numerous in number and small in size so as to function as "capillary holes" and thereby reduce spillage from the filter cartridge 10 when removed from an installation. A pair of diametrically opposed shoulders 44 are formed on the flange 40, closely adjacent to the cup section 38. The shoulders 44 are designed to connect the filter cartridge 10 with mating outlet tubing in a filtering system. The shoulders 44 may be configured to have internal or external threads, lugs, ears, or bayonets as required to fit any manifold or connector.

Figure 3:
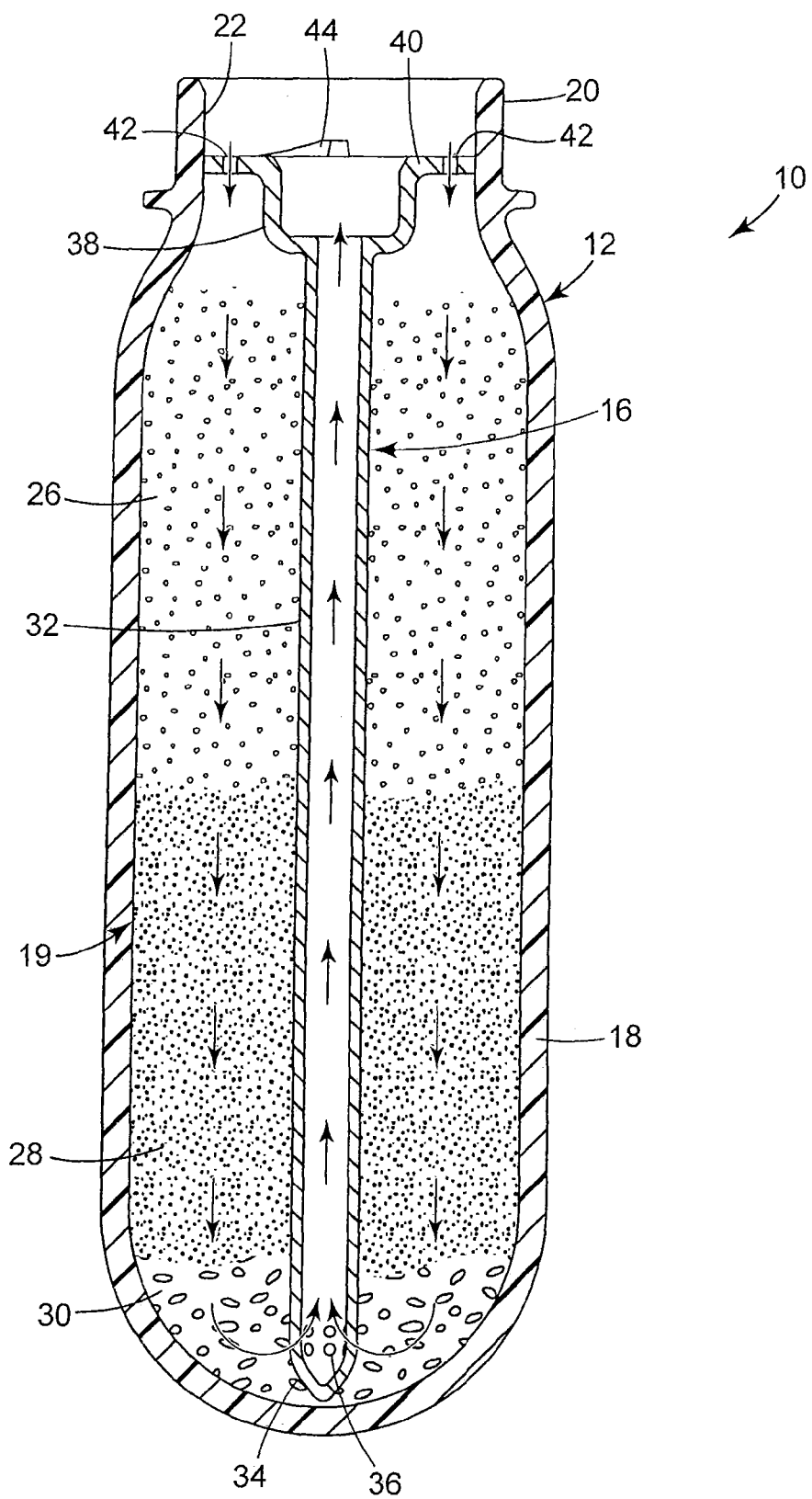
FIG. 3 is a cross-sectional view of the filter cartridge taken along line A-A of FIG. 2.
Figure 4:
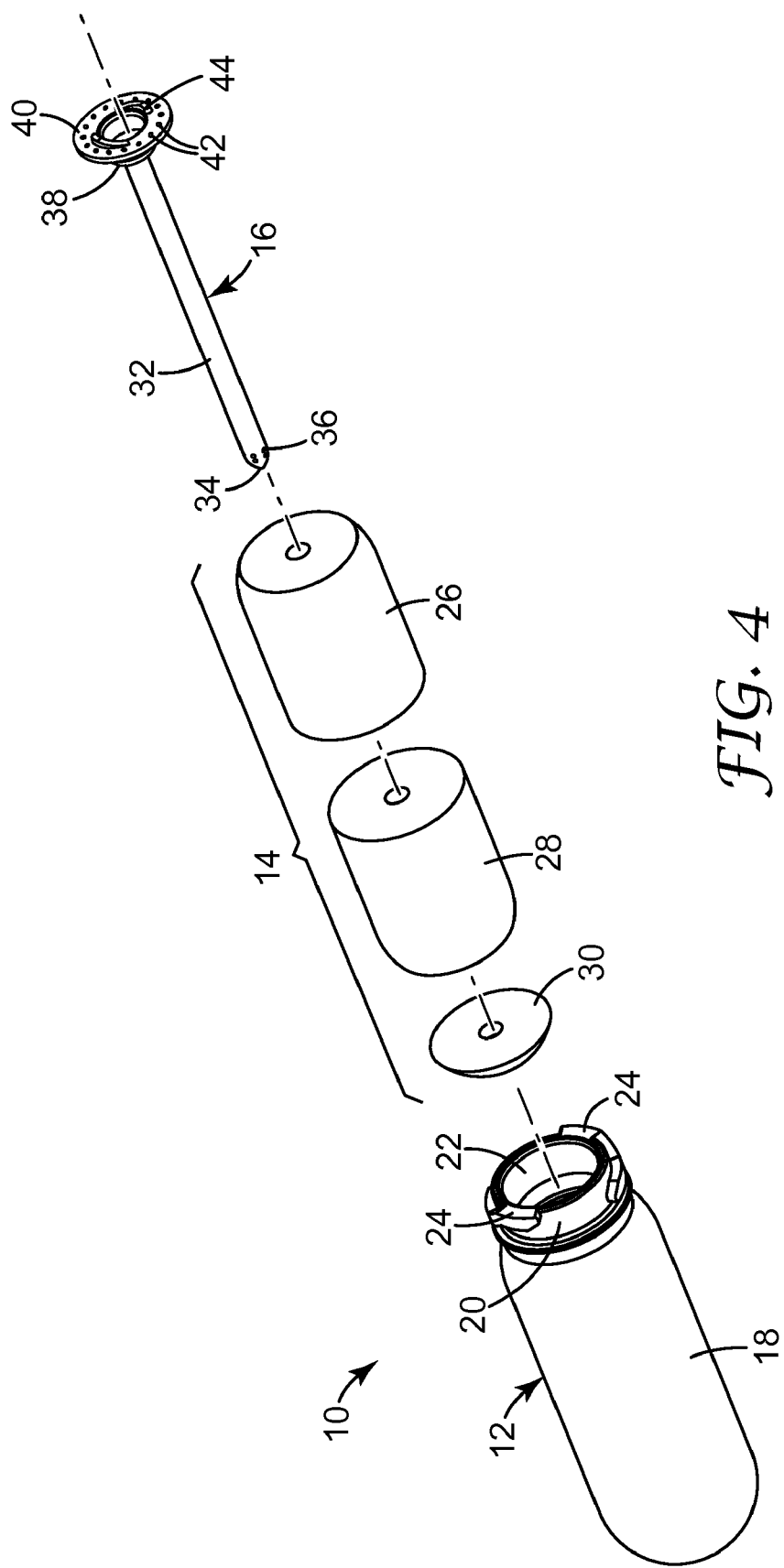
FIG. 4 is an exploded view of the filter cartridge of FIG. 1.

With this arrangement, filtrate enters the filter cartridge 10 through the port 22 and flows through the flange holes 42 (as best seen in FIG. 3) into the interior of the housing 12. The filtrate then flows axially through the porous filtration element 14, and more particularly sequentially through the first, second and third sections 26, 28 and 30 of the filtration element 14. The now-filtered filtrate then passes through the openings 36 near the bottom of the flow distribution tube 16 and flows upward through the tube section 32 and the cup section 38, exiting the filter cartridge 10 via the port 22. In this embodiment, the manifold is a coaxial depending male×male having an o-ring sealing the "cup". A process for constructing the filter cartridge 10 begins with producing the housing 12. The housing 12 can be fabricated with a variety of techniques such as blow molding, stretch blow molding (see, for example, the process described in U.S. Pat. No. 5,735,420 issued Apr. 7, 1998 to Nakamaki et al.), or injection molding with gas or water assist if the housing 12 is made of a plastic material and casting or spin forming if the housing 12 is made of a metallic or similar material.

Next, a predetermined amount of a selected granular material is introduced into the interior of the housing 12 through the port 22. As discussed above, the granular material, which will be transformed into a coherent filter block, can preferably, but not necessarily comprise a mixture of a granular filtration media and a binder. The binder will typically be a polymer or polymer-based substance in granular form that can be dry mixed with granular filtration media. In the illustrated embodiment, three forms of granular material will be used to produce the three sections 26, 28 and 30 of the filtration element 14. For example, a granular material comprising a mixture of a granular filtration media such as sand, diatomaceous earth and loose polymer pellets and an appropriate binder is introduced into the housing 12 first to make up the very open third section 30. The bottom layer may be with or without binder as desired. In some applications, it may be desirable not to have this layer coherent. Then another granular material comprising a mixture of a granular filtration media such as activated carbon or a carbon blend and an appropriate binder is introduced into the housing 12 on top of the first-loaded granular material to make up the second section 28. Lastly, yet another granular material comprising a mixture of a granular filtration media such as cellulose, cotton and wood fiber and an appropriate binder is introduced into the housing 12 on top of the second-introduced granular material to make up the open first section 26. The granular materials collectively fill the housing 12 to a level at or close to the neck 20.

As an optional step prior to loading the housing 12 with the granular materials, the inside surface of the housing 12 can be coated with a layer of a suitable primer material such as an electrostatic dust. The primer layer could be sprayed onto the inside surface through the port 22. In subsequent processing, the primer layer will bond itself to the housing 12 and the filtration element 14 to assure a proper union between these two elements in the final product.

After the housing interior is filled to the desired level with the granular materials, the flow distribution tube 16 is inserted into the housing 12 via the port 22 so as to be positioned coaxially within the housing 12. This is accomplished by pushing the flow distribution tube 16 tip first through the granular material until the tip 34 is in the desired location of being very close to, or in contact with, the closed bottom of the housing 12. The flow distribution tube 16 is situated so that the tube section 32 is coaxially positioned in the housing interior and the flange 40 is coaxially positioned in the port 22.

With the flow distribution tube 16 in the proper position, the granular material can optionally be compressed or "packed" to assure that the desired porosity is achieved upon transformation of the granular material into a coherent filter block. Possible techniques for compressing the granular material include vibrating the filled housing 12 or spinning the filled housing 12 in a centrifuge spun along its axis or radially. Alternatively, an expanding bladder can be inserted into the housing 12 to compress the material. The granular material could be compressed with a ram although this would be difficult due to the narrowness of the port 22 and the presence of the flow distribution tube 16.

Another optional step would be to pneumatically pressurize the housing interior. Although this would have little affect as far as compacting the granular filtration media, it would tend to cause the housing 12 to expand and would be useful in constructing filter cartridges intended for pressurized applications. In particular, applying an appropriate pressure during the material loading and sintering steps would simulate the expansion the housing 12 would undergo during use in a pressurized application. Thus, the granular material would conform to the size of the expanded housing so that after sintering the filtration element 14 would also correspond to the size of the expanded housing. The housing 12 would essentially be "pre-pressurized." This would avoid expansion of the housing 12 under pressure during use and undesirable gaps between the inner wall of the housing and the filtration element 14 that could develop due to such expansion.

The next step is to sinter the granular material so as to produce the finished filtration element 14 in the form of a coherent filter block. In this way, the housing 12 functions as a mold for forming the filtration element 14. Sintering is brought about by heating the granular material to a temperature (referred to as the "sintering temperature") at which molecules at the surface of the binder particles become mobile enough to intermingle with the molecules at the surface of adjoining particles, thus forming a bond between adjoining particles. In the case of polymeric binders, the sintering temperature will typically be the Vicat softening temperature (VST) of the polymer. The materials used for the housing 12 and the binder should be thermally compatible. That is, the housing 12 should be selected from a material that will not lose structural integrity when subjected to the sintering temperature of the binder material. The granular material is maintained at the sintering temperature until the desired degree of bonding has occurred, after which the entire assemblage is cooled. The heating duration will depend on a number of variables including the materials selected and the size of the filtration element.

Figure 5:
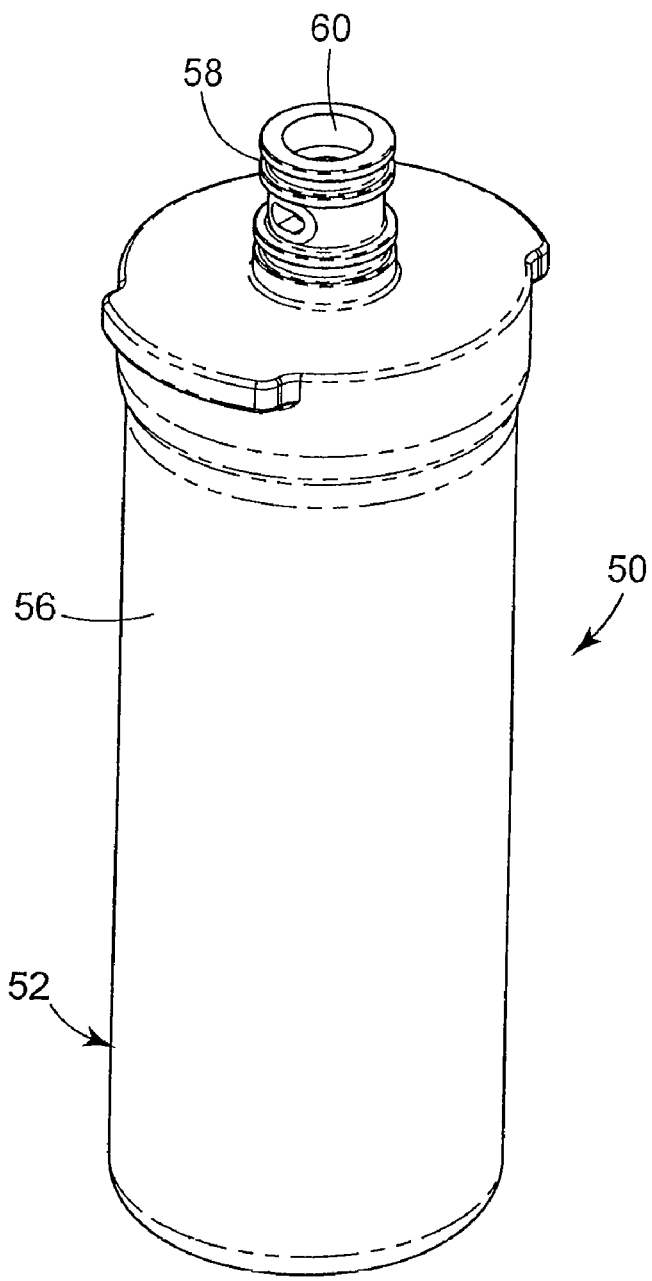
FIG. 5 is a perspective view of a filter cartridge in accordance with another embodiment of the present invention.
Figure 6:
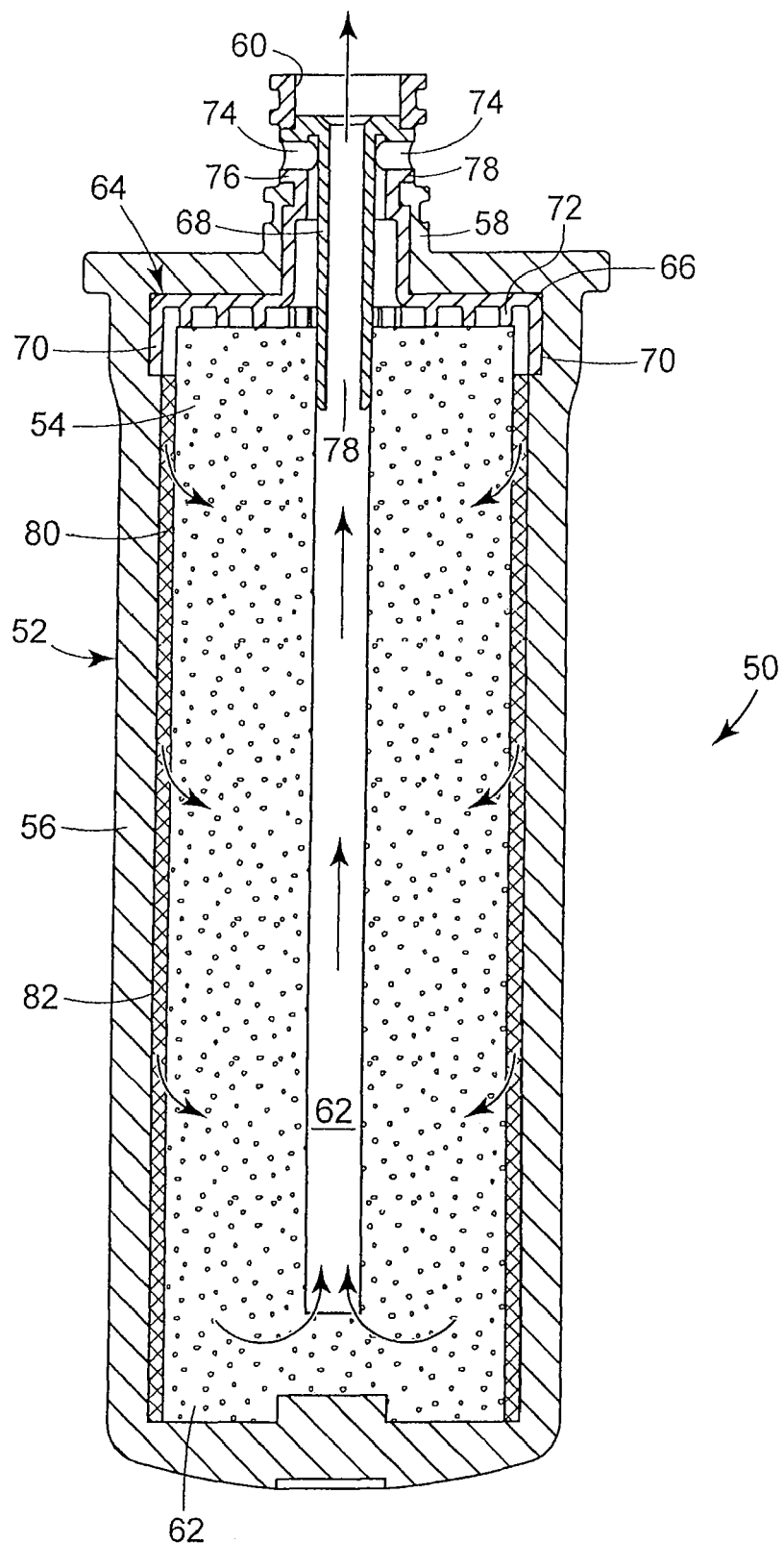
FIG. 6 is a longitudinal cross-sectional view of the filter cartridge of FIG. 5.

Referring now to FIGS. 5 and 6, a filter cartridge 50 constructed in accordance with another embodiment of the present invention is shown. The filter cartridge 50 includes a housing 52 having a hollow interior and a filtration element 54 disposed within the hollow interior. The housing 52 is a bottle-like, one-piece construction comprising a substantially cylindrical, elongated body 56 defining the hollow interior. The body 56 is closed at one end and has an open neck 58 formed on the other end. The neck 58 defines a port 60 for providing fluid communication to the hollow interior. The port 60 is smaller in cross dimension than the hollow interior and the filtration element 54, although the port 60 and the filtration element 54 could alternatively be equal in cross dimension. The filtration element 54 is a coherent filter block made of any suitable material or combination of materials, such as the filtration materials described above. Unlike the previously described embodiment, the filtration element 54 is not formed and thermally set within the housing interior. Instead, the filtration element 54 is first formed separately by any known of later developed technique. The housing 52 is then formed around the filtration element 54 as an overmolded shell in a manner described in more detail below. This results in a filter cartridge 50 having an one-piece housing 52 that contains a coherent block filtration element 54 that is larger in cross-dimension than the port 60.

In one embodiment, the filtration element 54 is a cylindrical carbon block having a center bore 62 formed therethrough. A first end cap 64 is disposed over the end of the filtration element 54 that is closest to the neck 58, and a second end cap 65 is disposed over the other end of the filtration element 54. The first end cap 64 includes a round annular base 66 and an upstanding tube section 68 extending outward from a first (upper) side of the base 66. The base 66 has an outer rim 70 around its perimeter that extends outward from the second side thereof (i.e., in the direction opposite of the tube section 68). The outer rim 70 is slightly larger in diameter than the cylindrical filtration element 54 so as to fit over the filtration element 54 and position the first end cap 64 relative to the filtration element 54. Ridges 72 formed on the second side of the base 66 space the base 66 from the end of the filtration element 54 so as to provide room for filtrate to freely pass. The tube section 68 is located inside of the neck 58 and is aligned axially with the center bore 62. At least one inlet hole 74 (two shown in FIG. 6) is formed in the sidewall of the tube section 68 and is aligned with a corresponding inlet hole 76 formed in the neck 58. A center tube 78 is disposed coaxially in the tube section 68 and includes a lower section that extends a short distance into the center bore 62. The diameter of the center tube 78 is smaller than the inside diameter of the tube section 68 so as to define an annular inlet flow channel therebetween. The inner passage of the center tube 78 defines an outlet flow channel.

Figure 7:
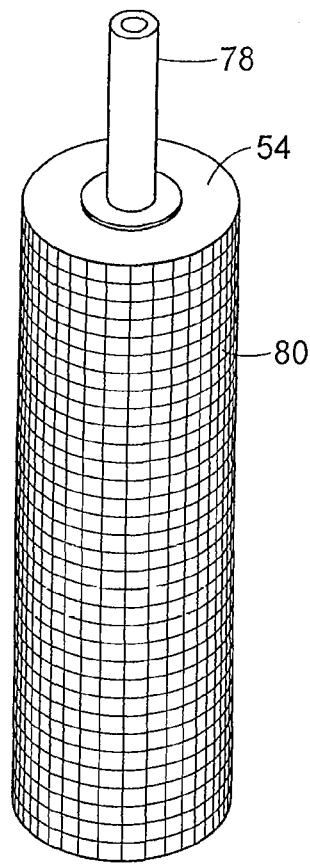
FIG. 7 is a perspective view of a filtration element wrapped in netting.

The filter cartridge 50 can optionally include netting 80 wrapped around the circumference of the filtration element 54 (see FIG. 7) so as to be located between the filtration element 54 and the housing 52. The space created by the netting 80 defines outer flow channels that allow filtrate to flow over the outer surface of the filtration element 54. A protective sheet 82 is wrapped around the netting 80 to prevent molten plastic from flowing into the channels defined by the netting 80 during the overmolding of the housing 52. Alternatively, the netting 80 can be omitted.

In operation, filtrate enters the filter cartridge 50 through the inlet holes 74 and 76 and flows through the annular inlet flow channel defined between the tube section 68 and the center tube 78 to the space between the end cap base 66 and the end of the filtration element 54. From there, filtrate flows axially into the filtration element 54 and through the outer channels defined by the netting 80 and then into the filtration element 54 as depicted by the arrows in FIG. 6. The filtrate passes through the filtration element 54 into the center bore 62. (If the netting 80 is omitted, then all of the filtrate would enter the filtration element 54 axially through the upper end thereof and flow through the filtration element 54 into the center bore 62.) The now-filtered filtrate flows upward through the bore 62 into the center tube 78, exiting the filter cartridge 50 via the port 60.

Figure 8:
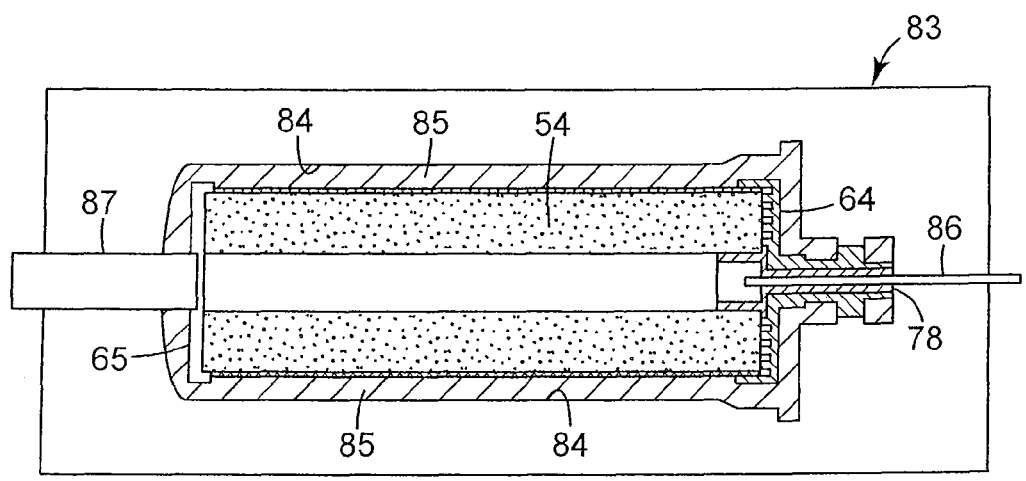
FIG. 8 is a side section view of an injection molding tool for producing the filter cartridge of FIG. 5.

A process for constructing the filter cartridge 50 includes separately forming the coherent block filtration element 54. The filtration element 54 can be formed using any suitable technique, including now known or later developed processes. Next, the first end cap 64 and center tube 78 are positioned over one end of the filtration element 54, with an end of the center tube 78 extending into the center bore 62. The second end cap 65 is positioned over the other end of the filtration element 54. If being used, the netting 80 and the protective sheet 82 are wrapped around the outer surface of the filtration element 54. This assembly is then placed into an injection molding tool 83, as shown in FIG. 8. The molding tool 83 includes side action pins 86 and 87 that support the assembly in the tool cavity 84 so as to provide a gap 85 between the assembly and the tool cavity 84. When the assembly is placed into the tool cavity 84 (with a robotic arm for example), the first side action pin 86 moves into engagement with the first end cap 64 and center tube 78, and the second side action pin 87 moves into engagement with a pocket formed in the center of the second end cap 65. The two halves of the injection molding tool 83 then close and the injection cycle begins. The tool 83 includes raised surfaces in the cavity 84 that abut the faces of the inlet ports 74, insuring that plastic does not plug these ports 74. Molten plastic is then injected into the tool cavity 84 so as to fill the gap 85. When the gap 85 has been substantially filled, but before the plastic solidifies, the second side action pin 87 is retracted and the void created by the retracted pin 87 is filled with plastic. The plastic encases the assembly, thereby forming the overmolded shell that becomes the housing 52. The overmolded shell is bonded to the outside surface of the filter element. The indent at the bottom of the housing 52 is where the pin 87 stops. After the shell has cooled, the tool 83 is opened and the side action pins 86 and 87 are completely retracted, allowing the filter cartridge 50 to be removed.

The housing 52 can be made from any suitable material; one material that is particularly suitable for many applications is polypropylene. The end caps 64, 65 and protective sheet 82 are preferably made of a material that is thermally compatible with the housing material. That is, these elements should be made of a material that will withstand the molding temperature of the molten plastic material during the overmolding step. Suitable materials include acrylontitrile-butadiene styrene and polycarbonate, which are thermally compatible with polypropylene.

Figure 22:
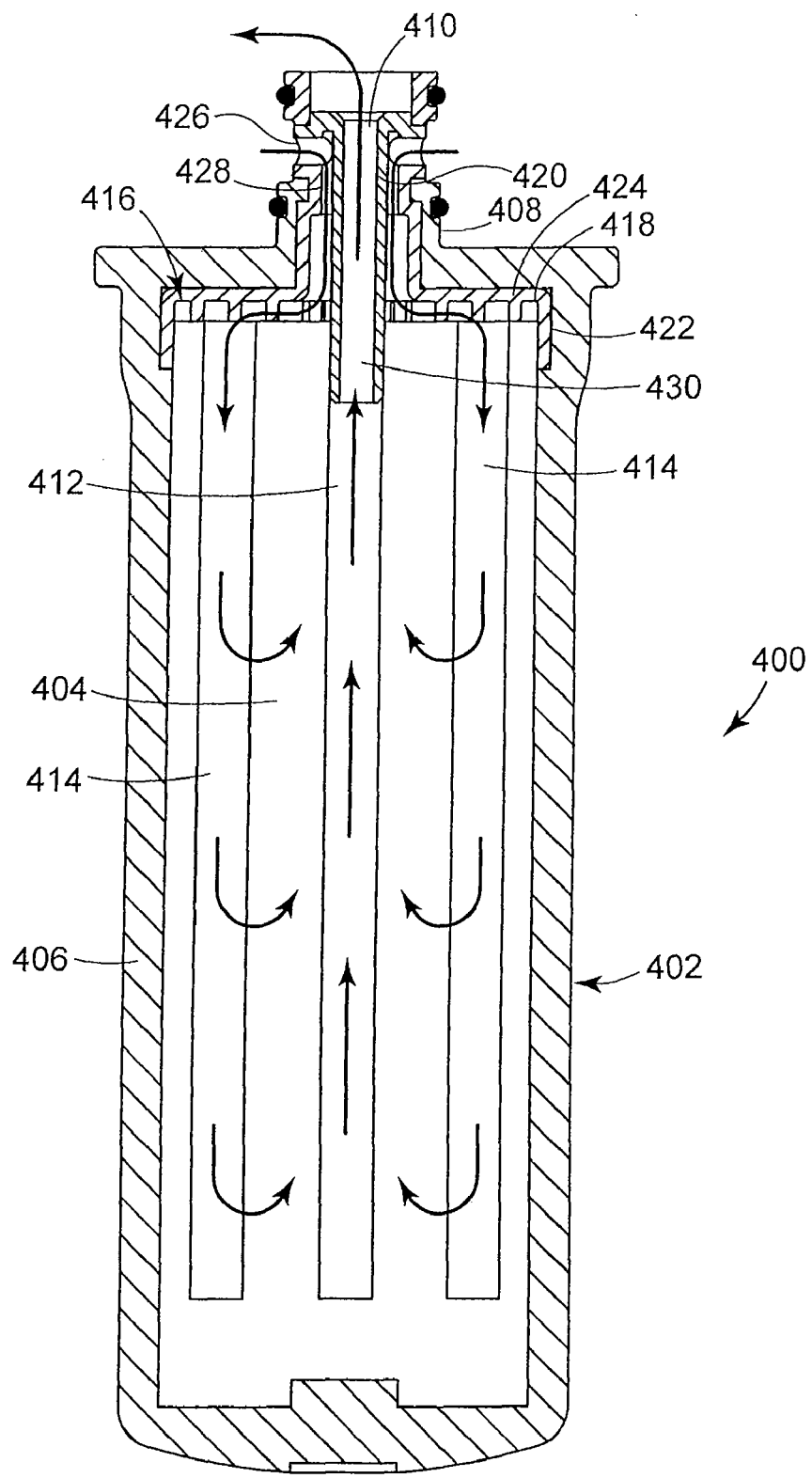
FIG. 22 is a longitudinal cross-sectional view of another embodiment of the filter cartridge of FIG. 5.

Referring now to FIG. 22, a filter cartridge 400 constructed in accordance with another embodiment of the present invention is shown. The filter cartridge 400 includes a housing 402 having a hollow interior and a filtration element 404 disposed within the hollow interior. The housing 402 is a bottle-like, one-piece construction comprising a substantially cylindrical, elongated body 406 defining the hollow interior. The body 406 is closed at one end and has an open neck 408 formed on the other end. The neck 408 defines a port 410 for providing fluid communication to the hollow interior. The port 410 is smaller in cross dimension than the hollow interior and the filtration element 404, although the port 410 and the filtration element 404 could alternatively be equal in cross dimension. The filtration element 404 is a coherent filter block made of any suitable material or combination of materials, such as the filtration materials described above. Like the embodiment described above, the filtration element 404 is first formed separately by any known of later developed technique. The housing 402 is then formed around the filtration element 404 as an overmolded shell in a manner described in more detail below. This results in a filter cartridge 400 having an one-piece housing 402 that contains a coherent block filtration element 404 that is larger in cross-dimension than the port 410.

In this embodiment, the filtration element 404 is a cylindrical carbon block having a center bore 412 and inlet bores 414 formed within a partial length of the carbon block. An end cap 416 is disposed over the end of the filtration element 404 that is closest to the neck 408. The end cap 416 includes a round annular base 418 and an upstanding tube section 420 extending outward from a first (upper) side of the base 418. The base 418 has an outer rim 422 around its perimeter that extends outward from the second side thereof (i.e., in the direction opposite of the tube section 420). The outer rim 422 is slightly larger in diameter than the cylindrical filtration element 404 so as to fit over the filtration element 404 and position the end cap 416 relative to the filtration element 404. Ridges 424 formed on the second side of the base 418 space the base 418 from the end of the filtration element 404 so as to provide room for filtrate to freely pass. Inlet bores 414 extend from the second side of the base 418. The tube section 420 is located inside of the neck 408 and is aligned axially with the center bore 412. At least one inlet hole 426 (two shown in FIG. 22) is formed in the sidewall of the tube section 420 and is aligned with a corresponding inlet hole 428 formed in the neck 408. A center tube 430 is disposed coaxially in the tube section 420 and includes a lower section that extends a short distance into the center bore 412. The diameter of the center tube 430 is smaller than the inside diameter of the tube section 420 so as to define an annular inlet flow channel therebetween. The inner passage of the center tube 430 defines an outlet flow channel.

The filter cartridge 400 can optionally include netting (not shown) wrapped around the circumference of the filtration element 404 (see FIGS. 6 & 7) so as to be located between the filtration element 404 and the housing 402.

In operation, filtrate enters the filter cartridge 400 through the inlet holes 426 and 428 and flows through the annular inlet flow channel defined between the tube section 420 and the center tube 430 to the space between the end cap base 418 and the end of the filtration element 404. From there, filtrate flows into the inlet bores 414 of filtration element 404 and through the outer channels defined by the netting 432 and then into the filtration element 404 as depicted by the arrows in FIG. 22. The fluid flow may be described as going from axial flow to radial flow. The filtrate passes through the filtration element 404 into the center bore 412. (If the netting is omitted, then all of the filtrate would enter the filtration element 404 via the inlet bores 414 through the upper end thereof and flow through the filtration element 404 into the center bore 412.) The now-filtered filtrate flows upward through the bore 412 into the center tube 430, exiting the filter cartridge 400 via the port 410.

A process for constructing the filter cartridge 400 includes separately forming the coherent block filtration element 404. The filtration element 404 can be formed using any suitable technique, including now known or later developed processes. The inlet bores 414 may be formed into the filtration element by any method known in the art. The inlet bores 414 may be formed in the block via the insertion of pins during the block forming process, and then removing the pins to form the inlet bores 414. The bores 414 may also be machined into the block using any boring technique such as drilling or milling. Next, the first end cap 416 and center tube 430 are positioned over one end of the filtration element 404, with an end of the center tube 430 extending into the center bore 412. If being used, the netting (not shown) and the protective sheet (not shown) are wrapped around the outer surface of the filtration element 404. This assembly is then placed into an injection molding tool 83, as shown in FIG. 8. The molding tool 83 includes side action pins 86 and 87 that support the assembly in the tool cavity 84 so as to provide a gap 85 between the assembly and the tool cavity 84. When the assembly is placed into the tool cavity 84 (with a robotic arm for example), the first side action pin 86 moves into engagement with the first end cap 416 and center tube 430, and the second side action pin 87 moves into engagement with a pocket formed in the center of the block. The two halves of the injection molding tool 83 then close and the injection cycle begins. The tool 83 includes raised surfaces in the cavity 84 that abut the faces of the inlet ports 426, insuring that plastic does not plug these ports 426. Molten plastic is then injected into the tool cavity 84 so as to fill the gap 85. When the gap 85 has been substantially filled, but before the plastic solidifies, the second side action pin 87 is retracted and the void created by the retracted pin 87 is filled with plastic. The plastic encases the assembly, thereby forming the overmolded shell that becomes the housing 402. The indent at the bottom of the housing 402 is where the pin 87 stops. After the shell has cooled, the tool 83 is opened and the side action pins 86 and 87 are completely retracted, allowing the filter cartridge 400 to be removed.

Like the embodiment described above, the housing 402 can be made from any suitable material; one material that is particularly suitable for many applications is polypropylene. The end cap 416 and protective sheet 434 are preferably made of a material that is thermally compatible with the housing material. That is, these elements should be made of a material that will withstand the molding temperature of the molten plastic material during the overmolding step. Suitable materials include acrylontitrile-butadiene styrene and polycarbonate, which are thermally compatible with polypropylene.

Figure 9:
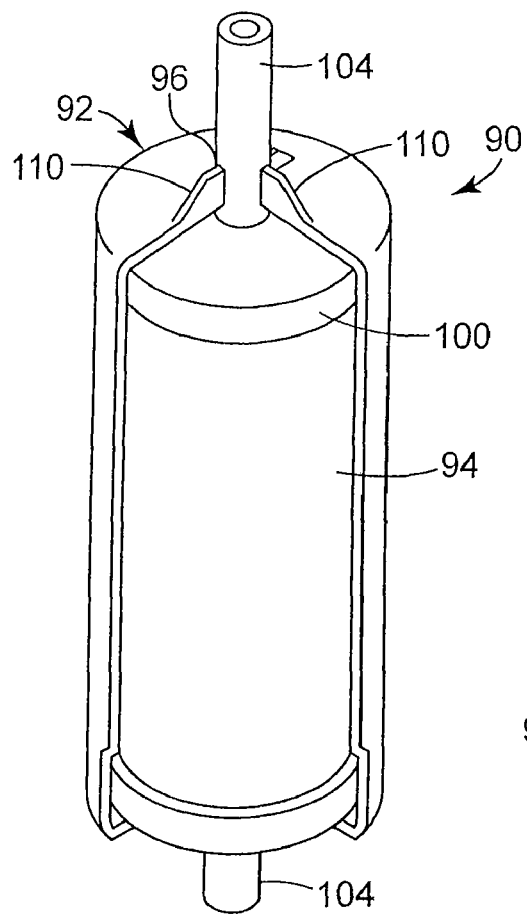
FIG. 9 is a partially cut-away perspective view of a filter cartridge in accordance with yet another embodiment of the present invention.
Figure 10:
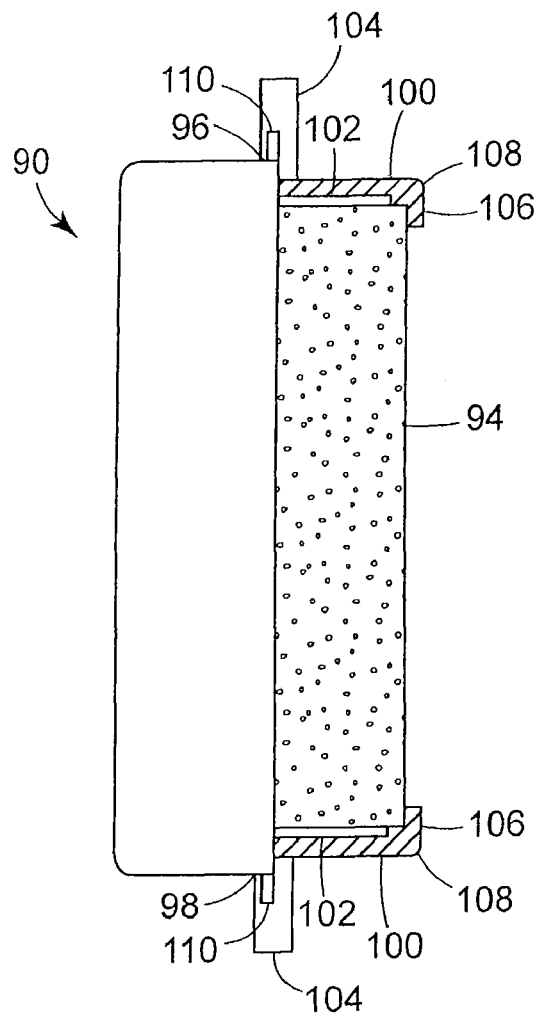
FIG. 10 is a longitudinal cross-sectional view of the filter cartridge of FIG. 9.

FIGS. 9 and 10 show another embodiment of a filter cartridge 90 having an overmolded housing. In this case, the filter cartridge 90 is an in-line type cartridge having a housing 92 and a filtration element 94 disposed within the hollow interior of the housing 92. The housing 92 is a one-piece construction comprising a substantially cylindrical body having a first opening 96 formed on one end and a second opening 98 formed on the opposite end. The filtration element 94 is a coherent filter block made of any suitable material or combination of materials.

In one embodiment, the filtration element 94 is a solid cylindrical carbon block. An end cap 100 is disposed over each end of the filtration element 94. Both end caps 100 include a round annular base 102 and an upstanding tube section 104 extending outward from a first side of the base 102. Each base 102 has an outer rim 106 around its perimeter that extends outward from the second side thereof (i.e., in the direction opposite of the tube section 104). Each outer rim 106 is slightly larger in diameter than the cylindrical filtration element 94 so as to fit over the respective end of the filtration element 94. Each end cap 100 includes an annular shoulder 108 formed on the base 102 at the foot of the outer rim 106. In each case, the shoulder 108 abuts the respective end of the filtration element 94 to space the base 102 from the end of the filtration element 94 and provide room for filtrate to freely pass. The filter cartridge can optionally include netting as described above, wrapped around the circumference of the filtration element so as to be located between the filtration element and the housing.

Each tube section 104 extends through a corresponding one of the openings 96 and 98 formed in the housing 92. That is, one of the tube sections 104 extends through the first opening 96 to define an inlet port, and the other one of the tube sections 104 extends through the second opening 98 to define an outlet port. These inlet and outlet ports are preferably, but not necessarily, smaller in cross dimension than the housing interior and the filtration element 94. A plurality of gussets 110 is provided around each tube section 104.

In operation, filtrate enters the filter cartridge 90 through the inlet port and flows into the space between the end cap base 102 and the end of the filtration element 94. From there, filtrate flows axially through the filtration element 94 and into the space between the second end cap base 102 and the other end of the filtration element 94. The now-filtered filtrate exits the filter cartridge 90 via the outlet port.

Figure 11:
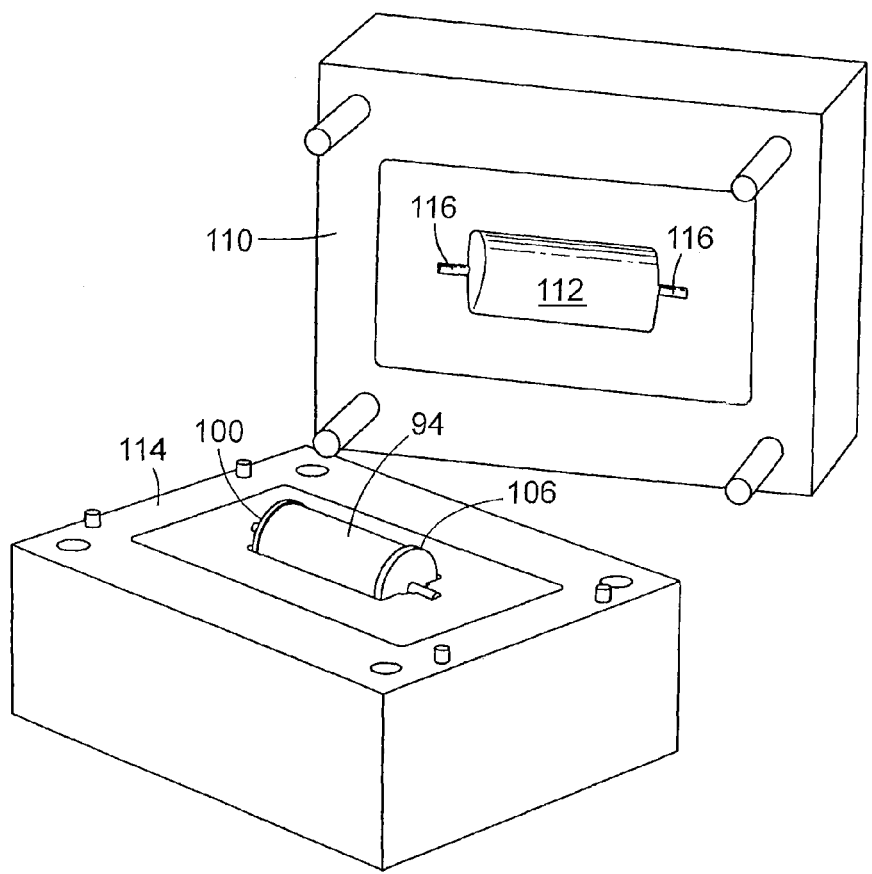
FIG. 11 is an exploded view of an injection molding tool for producing the filter cartridge of FIG. 9.

A process for constructing the filter cartridge 90 includes separately forming the coherent block filtration element 94. The filtration element 94 can be formed using any suitable technique, including now known or later developed processes. Next, an end cap 100 is positioned over each end of the filtration element 94. This assembly is then placed into the tool cavity 112 of an injection molding tool 114, as shown in FIG. 11. The distal ends of the end cap tube sections 104 are placed in appropriately shaped recesses 116 formed in the tool 114 adjacent to the tool cavity 112. The distal ends of the end cap tube sections 104 are then clamped between the two halves of the injection molding tool 114. The assembly is thus supported in the tool cavity 114 so as to provide a gap between the assembly and the tool cavity 114.

Molten plastic is then injected into the tool cavity 114 so as to fill the gap. The plastic encases the assembly (except for the portions of the end cap tube sections 104 clamped between the tool halves), thereby forming the overmolded shell that becomes the housing 92. After the shell has cooled, the filter cartridge 90 is removed from the injection molding tool 114. The housing 92 can be made from any suitable material such as polypropylene. The end caps 100 are preferably made of a material that is thermally compatible with the housing material. That is, these end caps 100 should be made of a material that will withstand the molding temperature of the molten plastic material during the overmolding step. Suitable materials include acrylontitrile-butadiene styrene and polycarbonate, which are thermally compatible with polypropylene.

Figure 12:
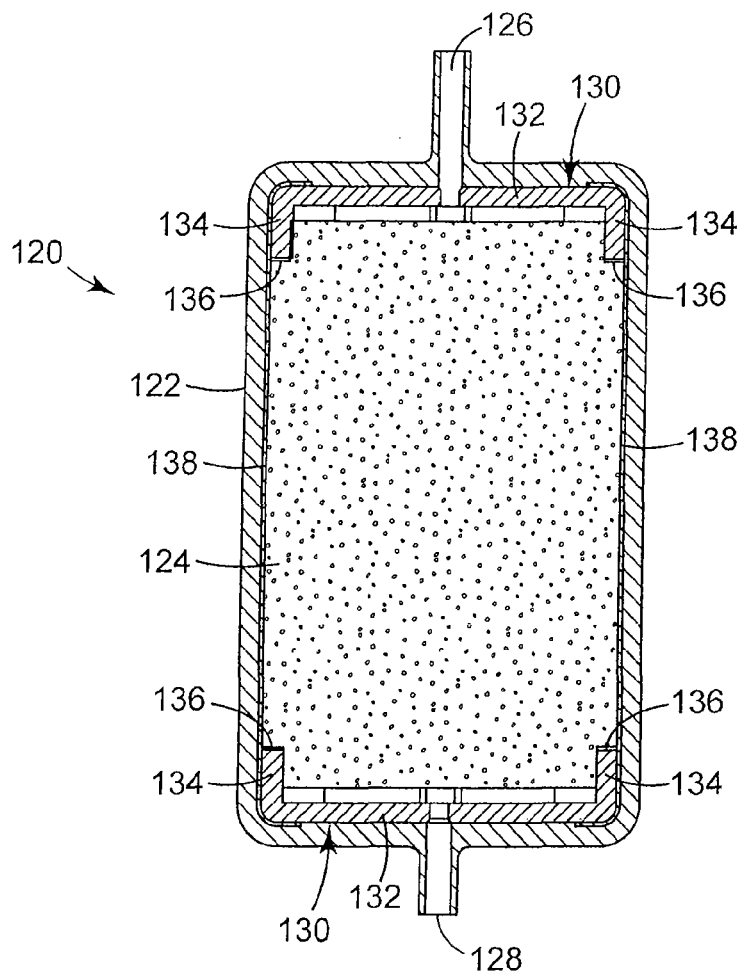
FIG. 12 is a longitudinal cross-sectional view of a filter cartridge in accordance with still another embodiment of the present invention.

Referring to FIG. 12, a variant embodiment of an in-line filter cartridge 120 having an overmolded housing is shown. The filter cartridge 120 includes a housing 122 and a filtration element 124 disposed within the hollow interior of the housing 122. The housing 122 is a one-piece construction comprising a substantially cylindrical body having an inlet port 126 formed on one end and an outlet port 128 formed on the opposite end. The ports 126 and 128 provide fluid communication to the interior of the housing 122. The filtration element 124 is a coherent filter block made of any suitable material or combination of materials.

In one embodiment, the filtration element 124 is a solid cylindrical carbon block. An end cap 130 is disposed over each end of the filtration element 124. Both end caps 130 include a round annular base 132 having a central opening and an outer rim 134 around its perimeter that extends outward from one side thereof. The central openings are aligned with a corresponding one of the inlet and outlet ports 126 and 128. Each outer rim 134 is slightly larger in diameter than the cylindrical filtration element 124 so as to fit over the respective end of the filtration element 124. An annular notch 136 is formed in the outer edge of each end of the filtration element 124. The outer rims 134 are received in the respective notches 136 to space the base 132 from the end of the filtration element 124 and provide room for filtrate to freely pass. A protective sheet 138, such as a shrink wrap, can optionally be wrapped around the circumference of the filtration element 124 and a portion of the end caps 130. The protective sheet 138, if used, will help hold the filtration element 124 and the end caps 130 together during the overmolding of the housing 122. Alternatively, the protective sheet 138 is omitted such that some molten plastic will flow into the filtration element's pores during the overmolding of the housing 122, thereby insuring that there is no chance of filtrate bypassing the filtration element 124. The filter cartridge can optionally include netting as described above, wrapped around the circumference of the filtration element so as to be located between the filtration element and the housing.

In operation, filtrate enters the filter cartridge 120 through the inlet port 126 and flows into the space between the end cap base 132 and the first end of the filtration element 124. From there, filtrate flows axially through the filtration element 124 and into the space between the second end cap base 132 and the other end of the filtration element 124. The now-filtered filtrate exits the filter cartridge 120 via the outlet port 128.

Figure 13:
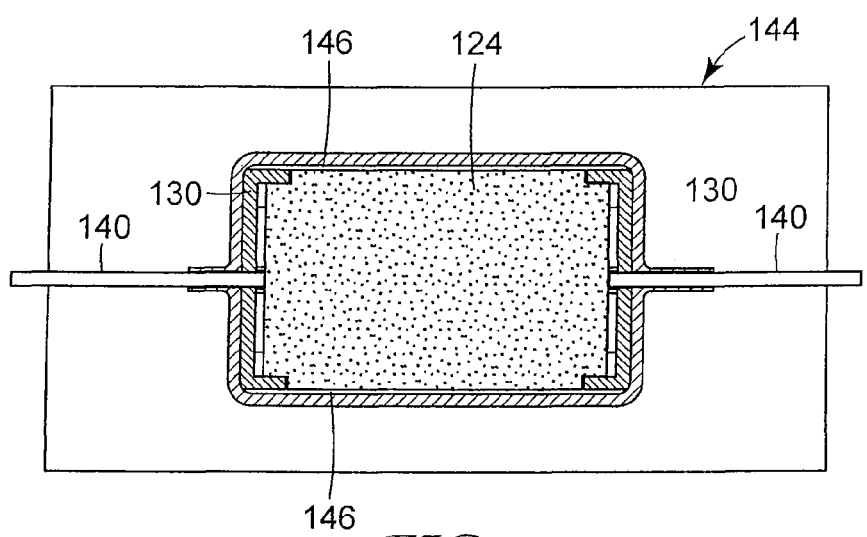
FIG. 13 is a side section view of an injection molding tool for producing the filter cartridge of FIG. 12.

A process for constructing the filter cartridge 120 includes separately forming the coherent block filtration element 124. The filtration element 124 can be formed using any suitable technique, including now known or later developed processes. Next, an end cap 130 is positioned over each end of the filtration element 124, and the protective sheet 138 (if used) is wrapped around the filtration element 124 and end caps 130. This assembly is then placed into the tool cavity 142 of an injection molding tool 144, as shown in FIG. 13. The molding tool 144 includes two side action pins 140 that support the assembly in the tool cavity 142 so as to provide a gap 146 between the assembly and the tool cavity 142. The side action pins 145 move into engagement with the respective end caps 130, and the two halves of the injection molding tool 144 close.

Molten plastic is then injected into the tool cavity 142 so as to fill the gap 146. The plastic encases the assembly, thereby forming the overmolded shell that becomes the housing 122. After the shell has cooled, the injection molding tool 144 is opened and side action pins 145 are retracted so that the filter cartridge 120 can be removed. The housing 122 can be made from any suitable material such as polypropylene. The end caps 130 and the protective sheet 138 (if used) are preferably made of a material that is thermally compatible with the housing material. That is, these end caps 130 and the protective sheet 138 (if used) should be made of a material that will withstand the molding temperature of the molten plastic material during the overmolding step. Suitable materials include acrylontitrile-butadiene styrene and polycarbonate, which are thermally compatible with polypropylene.

Figure 14:
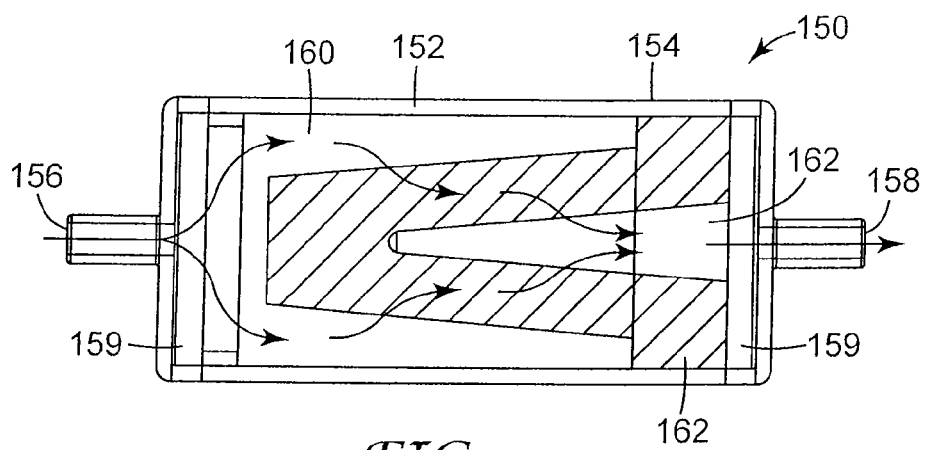
FIG. 14 is a longitudinal cross-sectional view of a filter cartridge having an alternative filtration element configuration.

Many other filtration element configurations can be used as alternatives to the solid carbon block shown in the above examples. For example, FIG. 14 shows an in-line filter cartridge 150 having an overmolded housing 152 and a filtration element 154 disposed within the hollow interior of the housing 152. The housing 152 includes an inlet port 156 and an outlet port 158. An end cap 159 is disposed over each end of the filtration element 154. The filtration element 154 is a two-part element comprising a first block 160 and a second block 162. The first block 160 has a substantially cylindrical outer surface and a tapered bore formed in one end and extending most of the way through the block 160. The second block 162 has a conical or tapered outer surface that matches the tapered bore of the first block 160 so that the two blocks 160 and 162 can be nestled together to form an overall cylindrical shape. A tapered bore 164 is formed in the other end of the second block 162. The first block 160, which functions as a "pre-filter," has a relatively high porosity and is used for particulate removal. The second block 162 is made of carbon or a similar adsorbent material and is used for chemical reduction. The filter cartridge can optionally include netting as described above, wrapped around the circumference of the filtration element so as to be located between the filtration element and the housing.

With this arrangement, filtrate enters the filter cartridge 150 through the inlet port 156. The filtrate flows axially through the filtration element 154, passing first through the first block 160 into the second block 162 and then to the bore 164. From there, the now-filtered filtrate exits the filter cartridge 150 via the outlet port 158.

Figure 15:
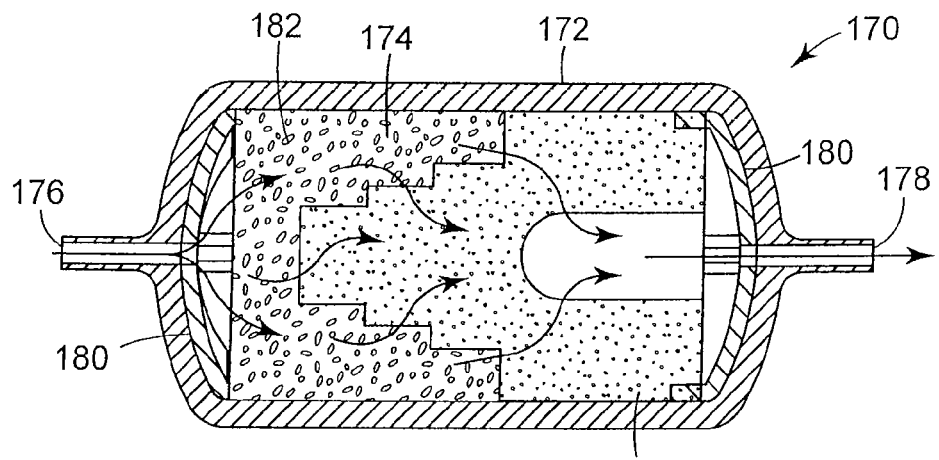
FIG. 15 is a longitudinal cross-sectional view of a filter cartridge having another alternative filtration element configuration.

FIG. 15 shows an embodiment of an in-line filter cartridge 170 including an overmolded housing 172 and a filtration element 174 having another alternative configuration. The housing 172 includes an inlet port 176 and an outlet port 178. The filter cartridge 170 has domed end caps 180, as opposed to the flat end caps of the previously described embodiments. The filtration element 174 is a variation of the two-part filtration element described above. The filtration element 174 comprises a first block 182 and a second block 184 that are nestled together to form an overall cylindrical shape. In this case, the second block 184 has a stepped outer surface that is received in a matching stepped bore formed in one end of the first block 182. A bore 186 is formed in the other end of the second block 184. As before, the first block 182 has a relatively high porosity and is used for particulate removal, and the second block 184 is made of carbon or a similar adsorbent material and is used for chemical reduction. During use, filtrate enters the filter cartridge 170 through the inlet port 176. The filtrate flows axially through the filtration element 174, passing first through the first block 182 and then into the second block 162 and then to the bore 186. From there, the now-filtered filtrate exits the filter cartridge 170 via the outlet port 178. The filter cartridge can optionally include netting as described above, wrapped around the circumference of the filtration element so as to be located between the filtration element and the housing.

Figure 16:
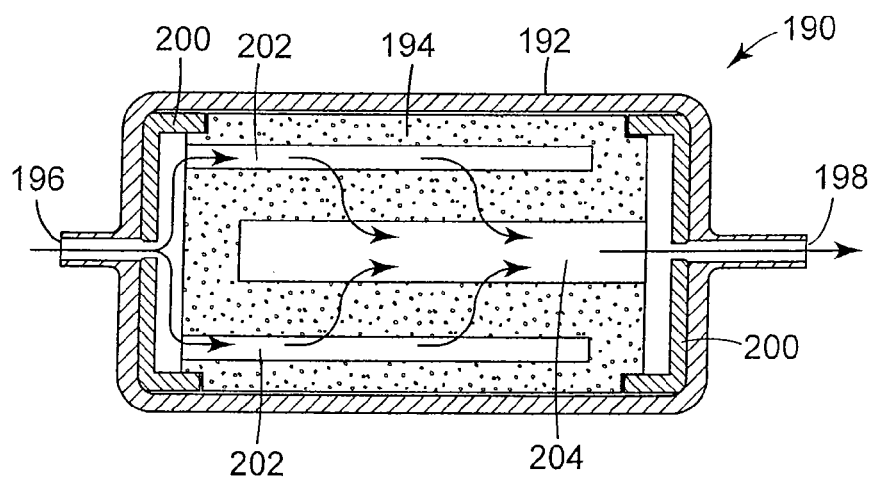
FIG. 16 is a longitudinal cross-sectional view of a filter cartridge having yet another alternative filtration element configuration.

FIG. 16 shows an in-line filter cartridge 190 including an overmolded housing 192 and a filtration element 194 having another alternative configuration. The housing 192 includes an inlet port 196 and an outlet port 198. An end cap 200 is disposed over each end of the filtration element 194. The filtration element 194 comprises a cylindrical block having a series of inlet bores 202 and a central outlet bore 204. The inlet bores are formed in the end of the filtration element 194 adjacent the inlet port 196 and extend most of the way through the block. A central outlet bore 202 is formed in the end of the filtration element 194 adjacent the outlet port 198 and extends most of the way through the block. The inlet bores 204 are spaced around the centrally located outlet bore 204. In operation, filtrate enters the filter cartridge 190 through the inlet port 196 and flows into the space between the first end cap 200 and the end of the filtration element 194. From there, filtrate flows into the inlet bores 202, passes through the filtration element 194 and into the center outlet bore 204. From there, the now-filtered filtrate exits the filter cartridge 190 via the outlet port 198. The fluid flow may be described as from axial flow over to radial flow. Alternative block configurations can also be employed with quick-change type filter cartridges. The filter cartridge can optionally include netting as described above, wrapped around the circumference of the filtration element so as to be located between the filtration element and the housing.

Figure 17:
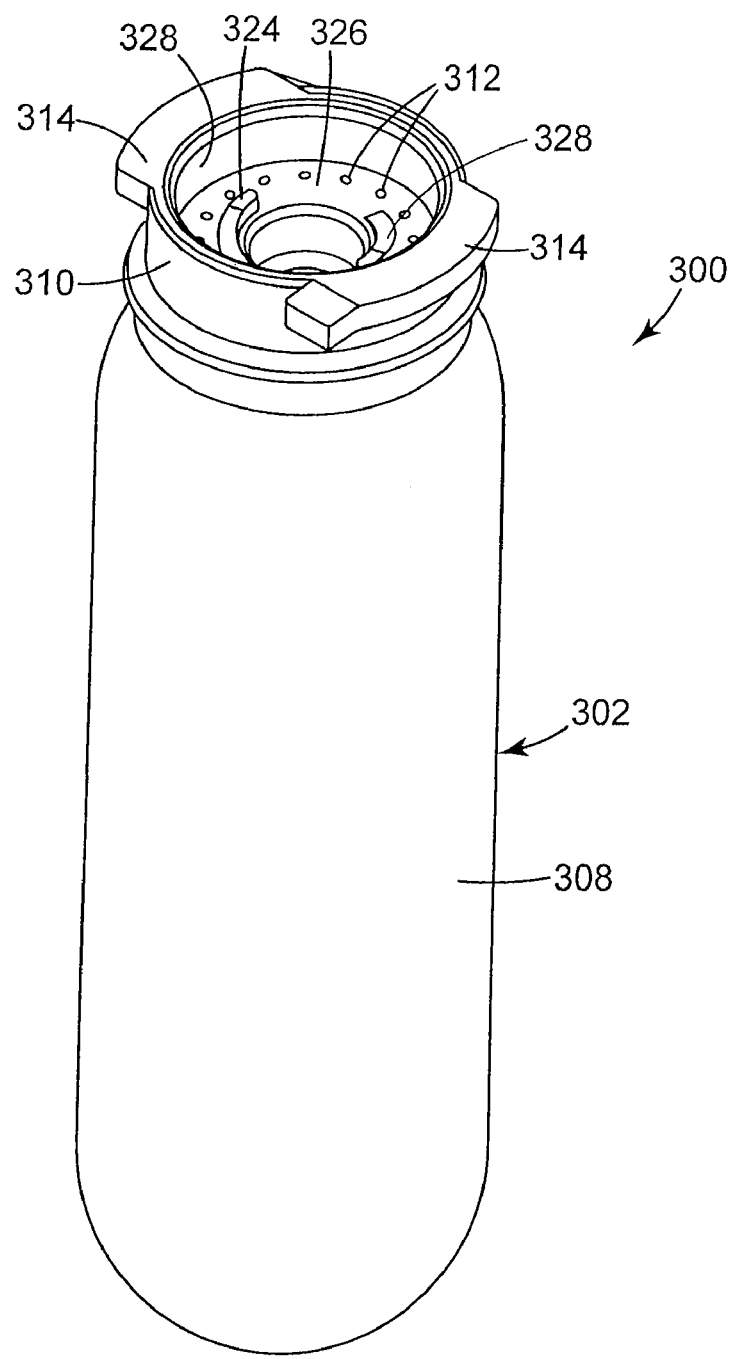
FIG. 17 is a perspective view of a filter cartridge in accordance with one embodiment of the present invention.
Figure 18:
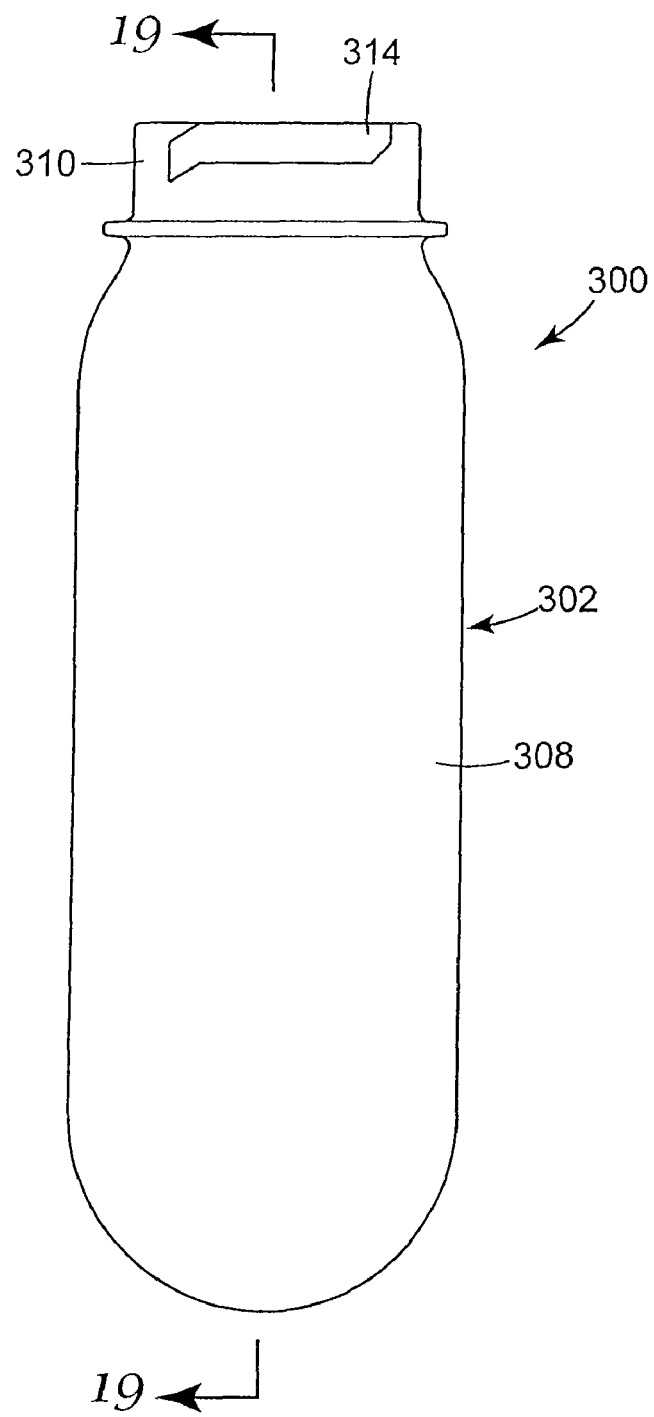
FIG. 18 is a side view of the filter cartridge of FIG. 17.
Figure 19:
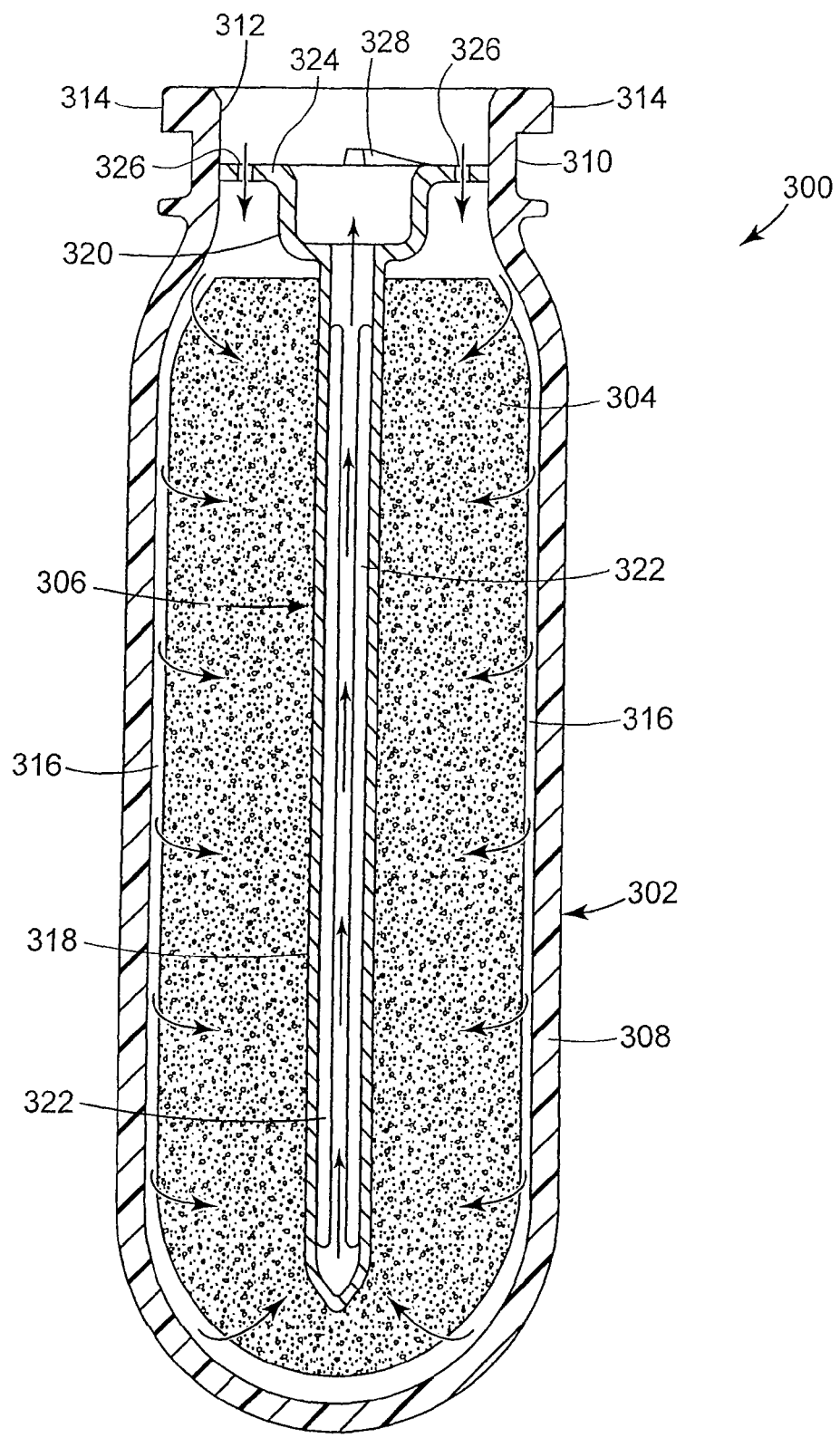
FIG. 19 is a cross-sectional view of the filter cartridge taken along line 3-3 of FIG. 18.
Figure 20:
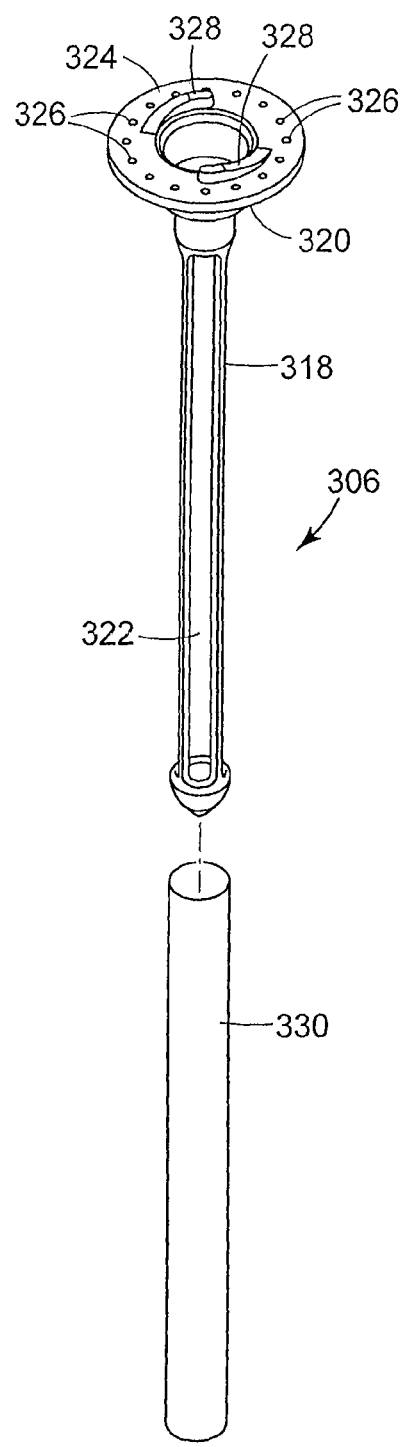
FIG. 20 is an exploded view of a flow distribution tube for use in an embodiment filter cartridge of the invention.

Referring now again to the drawings wherein identical reference numerals denote the same elements throughout the various views, FIGS. 17-19 show a filter cartridge 300 constructed in accordance with another embodiment of the present invention. The filter cartridge 300 includes a housing 302, a filtration element 304 disposed in the housing 302, and a flow distribution tube 306 that supports the filtration element 304 within the housing 302. In this embodiment, the housing 302 is a bottle-like, one-piece construction comprising a substantially cylindrical, elongated body 308 having an inner surface defining a hollow interior and a central, longitudinal axis. The body 308 is closed at one end and has an open neck 310 formed on the other end. The neck 310 defines a port 312 for providing fluid communication to the hollow interior. The port 312 is shown as being smaller in cross dimension than the body 308 to facilitate sealing thereof. However, it should be noted that the port 312 could alternatively be equal in cross dimension to the body 308. Two diametrically opposed shoulders 314 are formed on the outer surface of the neck 310. The shoulders 314 are designed to interface with corresponding structure for connecting the filter cartridge into a filtering system. The housing 302 can be made from any suitable material; one material that is particularly suitable for many applications is polyethylene terephthalate (PET).

The filtration element 304 is a coherent filter block (e.g., a matrix of granular filtration media and a binder) that is formed and set within the interior of the housing 302. The filtration element 304 generally conforms to the substantially cylindrical shape of the housing interior, but is slightly smaller than the housing interior so as to define a substantially annular gap or space 316 between the filtration element 304 and the inner surface of the housing 302. In the illustrated embodiment, the filtration element 304 substantially fills the housing interior from the bottom of the housing 302 to a point just below the neck 310 and is larger in cross dimension than the port 312. The filtration element described herein is just one example of a filtration element that can be used in this embodiment; many other configurations are possible.

The flow distribution tube 306, which is preferably made of a rigid or semi-rigid material such as plastic or metal, is positioned coaxially inside the housing 302. In the illustrated embodiment, the flow distribution tube 306 includes a narrow tube section or stem 318 and a cylindrical cup section 320. The filtration element 304 is mounted to the stem 318, which extends coaxially into the filtration element 304. The stem 318 has a closed first end and an open second end. The first end defines a tapered tip that is located near the bottom of the filtration element 304. A number of longitudinal slots 322 are formed through the stem wall. The slots 322 are spaced about the circumference of the stem 318 and extend over most of the stem length. The stem 318 is thus porous for the majority of its surface area that is in contact with the filtration element 304. The slots 322 permit filtrate flowing through the filtration element 304 to flow into the stem 318, which serves as a collector for filtered filtrate.

The open second end of the stem 318 is positioned adjacent to the port 312, beyond the filtration element 304. The cylindrical cup section 320 is formed concentrically on the second end so as to be disposed within the port 312. The cup section 320 has a larger diameter than the stem 318 and is positioned inside the port 312. An annular flange 324 is formed on the upper edge of the cup section 320. The flange 324 has a circular outer edge defining an outside diameter that is substantially equal to the diameter to the port 312 so that the outer edge snugly abuts the inner surface of the neck 310. A number of holes 326 are formed in the flange 324 to allow fluid communication between the "head space" (i.e., the portion of the port 312 located above the flange 324) and the interior of the housing 302. The holes 326 are preferably numerous in number and small in size so as to function as "capillary holes" and thereby reduce spillage from the filter cartridge 300 when removed from an installation. The cup section 320 and the flange 324 thus act as a sealing surface to separate inlet and outlet flows. Two diametrically opposed shoulders 328 are formed on the flange 324, closely adjacent to the cup section 320. The shoulders 328 are designed to connect the filter cartridge 300 with mating outlet tubing in a filtering system. Interior cup section 320 serves to provide a sealing surface with the mating manifold elastomeric seal. Cup section 320 acts much like a straw to channel the filtered fluid without leakage to the manifold. Both of the port 312 and cup section 320 have O-ring seals with the mating manifold where the cup section O-ring seals between the inlet and outlet and the port O-ring seals the housing to the inlet.

Figure 21:
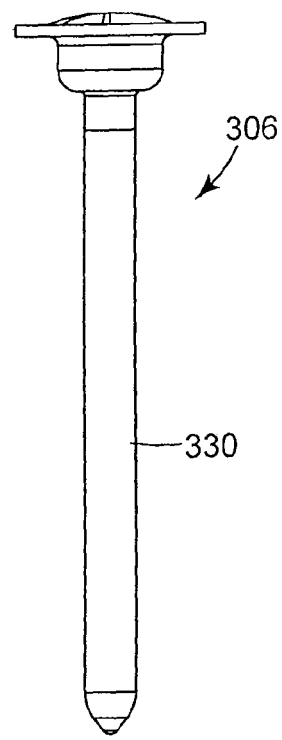
FIG. 21 is a complete flow distribution tube for use in an embodiment filter cartridge of the invention.

As best seen in FIGS. 21 and 22, the flow distribution tube 306 includes a porous sleeve 330 positioned over the stem 318. The sleeve 330 is made of a screen material or a permeable membrane formed into a cylinder that is sized to fit snugly over the stem 318 and cover the slots 322. The sleeve 330 thus prevents granular material from entering the stem 318 prior to transformation into a coherent filter block, while providing a fluid flow path for filtrate to pass from the filtration element 304 into the stem 318.

In operation, filtrate enters the filter cartridge 300 through the port 312 and flows through the flange holes 326 (as best seen in FIG. 19) into the interior of the housing 302. The filtrate completely floods the gap 316 between the filtration element 304 and the inner surface of the housing 302 and then penetrates the full exterior of the filtration element 304. Filtrate flows through the porous filtration element 304 inward toward the stem 318 (i.e., substantially radially), passes through the sleeve 330 and the slots 322, and is collected in the stem 318. The now-filtered filtrate flows upward through the stem 318 into the cup section 320 and exits the filter cartridge 300 via the port 312.

A process for constructing the filter cartridge 300 begins with producing the housing 302. The housing 302 can be fabricated from a plastic material with a variety of techniques such as blow molding, stretch blow molding (see, for example, the process described in U.S. Pat. No. 5,735,420 issued Apr. 7, 1998 to Nakamaki et al.), or injection molding with gas or water assist. Alternatively, the housing 302 can be made from a metallic or similar material using techniques such as casting, spin forming, stamping, drawing, or the like.

Next, a predetermined amount of a selected granular material is introduced into the interior of the housing 302 through the port 312. As discussed above, the granular material, which will be transformed into a coherent filter block, can preferably, but not necessarily comprise a mixture of a granular filtration media and a binder. The binder will typically be a polymer or polymer-based substance in granular form that can be dry mixed with granular filtration media. The granular material could alternatively be comprised entirely of a polymer material. The granular material is formulated so that it will shrink during subsequent processing. That is, by selecting proper amounts of suitable ingredients, such as polyethylene (particularly ultra-high molecular weight polyethylene), the granular material will shrink so as to produce a completed filtration element 304 having the desired size and shape. Namely, a size and shape that generally conforms to the substantially cylindrical shape of the housing interior, but is slightly smaller than the housing interior so as to define the gap 316. The shrinkage factor will preferably be in the range of about 1-10%, depending on materials, processing, and temperature. By way of example, a shrinkage factor of 5% with a housing 302 having an inside diameter of 2.00 inches (5.1 cm) will yield a filtration element diameter of 1.90 inches (4.8 cm) with radial gap of 0.050 inches (0.13 cm) an each side.

After the housing interior is filled to the desired level with the granular materials, the flow distribution tube 306 is inserted into the housing 302 via the port 312 so as to be positioned coaxially within the housing 302. This is accomplished by pushing the flow distribution tube 306 tip first through the granular material until the tapered end of the stem 318 is in the desired location of being near the closed bottom of the housing 302. The flow distribution tube 306 is situated so that the stem 318 is coaxially positioned in the housing interior and the flange 34 is coaxially positioned in the port 312.

With the flow distribution tube 306 in the proper position, the granular material can optionally be compressed or "packed" to assure that the desired porosity is achieved upon transformation of the granular material into a coherent filter block. Possible techniques for compressing the granular material include vibrating the filled housing 302 or spinning the filled housing 302 in a centrifuge. Alternatively, an expanding bladder can be inserted into the housing 302 to compress the material. The granular material could be compressed with a ram although this would be difficult due to the narrowness of the port 312 and the presence of the flow distribution tube 306.

The next step is to process the granular material so as to produce the finished filtration element 304 in the form of a coherent filter block. In this way, the housing 302 functions as a mold for forming the filtration element 304. By using the housing 302 as a mold, instead of a massive metal mold, significant manufacturing and energy savings are realized. As mentioned before, sintering is one approach to processing the granular material. In this case, sintering is brought about by heating the granular material to a temperature (referred to as the "sintering temperature") at which molecules at the surface of the binder particles become mobile enough to intermingle with the molecules at the surface of adjoining particles, thus forming a bond between adjoining particles. In the case of polymeric binders, the sintering temperature is at least, but can exceed the Vicat softening temperature (VST) of the polymer. The materials used for the housing 302 and the binder should be thermally compatible. That is, the housing 302 should be selected from a material that will not lose structural integrity when subjected to the sintering temperature of the binder material. The granular material is maintained at the sintering temperature until the desired degree of bonding has occurred, after which the entire assemblage is cooled. The heating duration will depend on a number of variables including the materials selected and the size of the filtration element. During the heating and cooling process, the filtration element 304 shrinks and bonds itself to the stem 318. The stem 318 can be textured (such as with a roughened surface or small protrusions) so as to enhance the bonding of the filtration element 304 thereto. Alternatively, the stem can be made from a material that is suitable for chemical bonding with the binder.

While specific embodiments of the present invention have been described, it will be apparent to those skilled in the art that various modifications thereto can be made without departing from the spirit and scope of the invention as defined in the appended claims.

What is claimed is:

1. A method of forming a filter cartridge comprising:
providing at least one coherent block filtration element;
overmolding a shell around the filtration element to encase the filtration element, the overmolded shell forming a one-piece housing comprising at least one port; wherein each port comprises an opening that is smaller than a maximum cross-dimension of the filtration element.

2. The method of claim 1 further comprising wrapping a netting around the filtration element prior to overmolding.

3. The method of claim 2 further comprising wrapping a protective sheet around the netting prior to overmolding.

4. The method of claim 1 further comprising wrapping a protective sheet around the filtration element prior to overmolding.

5. The method of claim 1 further comprising disposing a first end cap over a first end of the filtration element prior to overmolding.

6. The method of claim 5 wherein the end cap comprises a base having a first side facing away from the filtration element and a second side facing toward the filtration element, wherein the second side comprises structure configured to provide room for a filtrate to freely pass.

7. The method of claim 1 further comprising disposing a center tube at least partially within a center bore of the filtration element prior to overmolding.

8. The method of claim 5 further comprising disposing a second end cap over a second end of the filtration element prior to overmolding.

9. A method of forming a filter cartridge comprising:
providing a coherent block filtration element assembly comprising at least one coherent block filtration element and at least one end cap disposed on at least one end of the filter element;
placing the assembly into an injection molding tool having a tool cavity;
maintaining a gap between assembly and the tool cavity;
injecting molten plastic into the tool cavity to fill the gap and encase the assembly in a shell;
cooling the shell to form a housing comprising a port having an opening that is smaller than a maximum cross-dimension of the filtration element; and
removing the filter cartridge from the injection molding tool.

10. The method of claim 9 wherein the housing comprises a neck, wherein the neck comprises the port.

11. The method of claim 9 wherein the assembly further comprises a center tube disposed at least partially within a center bore of the filtration element.

12. The method of claim 9 wherein the molten plastic comprises a first material having a molding temperature, and wherein the at least one end cap comprises a second material that is capable of withstanding the molding temperature.

13. The method of claim 12, wherein the first material is polypropylene and the second material is selected from the group consisting of acrylonitrilebutadiene styrene and polycarbonate.

14. The method of claim 9 wherein the assembly further comprises a netting wrapped around the filtration element.

15. The method of claim 14 wherein the assembly further comprises a protective sheet wrapped around the netting.

16. The method of claim 9 wherein the assembly comprises a protective sheet wrapped around the filtration element.

17. The method of claim 9 wherein the at least one end cap comprises a base having a first side facing away from the filtration element and a second side facing toward the filtration element, wherein the second side comprises structure configured to provide room for a filtrate to freely pass.

18. The method of claim 9 wherein the gap is maintained by at least one pin, the method further comprising, after the molten plastic is injected,
retracting the at least one pin; and
allowing the space formerly occupied by the pin to fill with molten plastic.

19. The method of claim 1 wherein the filtration element further comprises a plurality of blind inlet bores and a central outlet bore.

20. The method of claim 9 wherein the filtration element further comprises a plurality of blind inlet bores and a central outlet bore.

21. The method of claim 1 wherein the one-piece housing comprises a substantially cylindrical body having a first end and a second end, and wherein the at least one port in the one-piece housing comprises:
an inlet port on the first end; and
an outlet port on the second end.

* * * * *

UNITED STATES PATENT AND TRADEMARK OFFICE
CERTIFICATE OF CORRECTION

PATENT NO. : 8,246,883 B2
APPLICATION NO. : 12/135915
DATED : August 21, 2012
INVENTOR(S) : Laurence W Bassett et al.

It is certified that error appears in the above-identified patent and that said Letters Patent is hereby corrected as shown below:

Column 4
Line 37, delete "electromagnetic" and insert -- electro-magnetic --, therefor.

Column 5
Line 31, delete "ryholites," and insert -- rhyolites, --, therefor.

Column 10
Lines 63-64, delete "acrylontitrile-butadiene" and insert
-- acrylonitrile-butadiene --, therefor.

Column 12
Line 52, delete "acrylontitrile-butadiene" and insert
-- acrylonitrile-butadiene --, therefor.

Column 13
Line 58, delete "acrylontitrile-butadiene" and insert
-- acrylonitrile-butadiene --, therefor.

Column 14
Line 66, delete "acrylontitrile-butadiene" and insert
-- acrylonitrile-butadiene --, therefor.

Column 20
Line 19, in Claim 13, delete "acrylonitrilebutadiene" and insert
-- acrylonitrile-butadiene --, therefor.

Signed and Sealed this
Sixth Day of November, 2012

David J. Kappos
*Director of the United States Patent and Trademark Office*